(12) United States Patent
Nagase et al.

(10) Patent No.: US 6,892,588 B2
(45) Date of Patent: May 17, 2005

(54) TORQUE SENSOR

(75) Inventors: Shigeki Nagase, Nabari (JP); Masahiko Sakamaki, Ikoma-gun (JP); Katsutoshi Nishizaki, Nabari (JP); Shirou Nakano, Minamikawachi-gun (JP); Yoshikazu Kuroumaru, Kashiwara (JP); Ken Matsubara, Matsubara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/614,619

(22) Filed: Jul. 7, 2003

(65) Prior Publication Data
US 2004/0020309 A1 Feb. 5, 2004

(30) Foreign Application Priority Data

Jul. 10, 2002 (JP) ........................................ 2002-201298
Jul. 10, 2002 (JP) ........................................ 2002-201559
Sep. 10, 2002 (JP) ........................................ 2002-264367

(51) Int. Cl.[7] ............................. G01L 3/02; G01L 3/10; G01L 3/12; G01L 3/14
(52) U.S. Cl. ................................................. 73/862.326
(58) Field of Search .................... 73/862.326, 862.339; 180/79.1, 443; 702/41, 151

(56) References Cited

U.S. PATENT DOCUMENTS

| | | | | |
|---|---|---|---|---|
| 3,599,039 A | * | 8/1971 | Miyashita et al. | .......... 361/244 |
| 4,762,007 A | | 8/1988 | Gasperi et al. | |
| 4,805,463 A | * | 2/1989 | Kelledes et al. | ........ 73/862.331 |
| 4,874,053 A | * | 10/1989 | Kimura et al. | .............. 180/443 |
| 5,398,555 A | * | 3/1995 | Ueno et al. | ............ 73/862.326 |
| 6,520,031 B2 | * | 2/2003 | Madni et al. | ........... 73/862.326 |

FOREIGN PATENT DOCUMENTS

| | | |
|---|---|---|
| DE | 100 47 949 | 5/2001 |
| EP | 0 325 517 | 7/1989 |
| EP | 1 213 562 | 6/2002 |
| FR | 2 705 452 | 11/1994 |
| JP | 7-318442 | 12/1995 |
| JP | 10-170357 | 6/1998 |
| JP | 2001-194251 | 7/2001 |
| JP | 2001-272204 | 10/2001 |
| WO | WO-01/71288 | 9/2001 |

* cited by examiner

*Primary Examiner*—Octavia L Davis
(74) *Attorney, Agent, or Firm*—Jordan and Hamburg LLP

(57) ABSTRACT

A first alternating signal of which phase changes according to changes in the rotation angle of a first shaft is output, and a second alternating signal of which phase changes according to changes in the rotation angle of a second shaft capable of rotating elastically with respect to the first shaft is output. A phase difference correspondence signal of which waveform changes according to changes in the phase difference between the first alternating signal and second alternating signal is output. A value corresponding to the torque transmitted by the first and second shafts is found from the phase difference correspondence signal.

16 Claims, 14 Drawing Sheets

Fig. 5 (1)
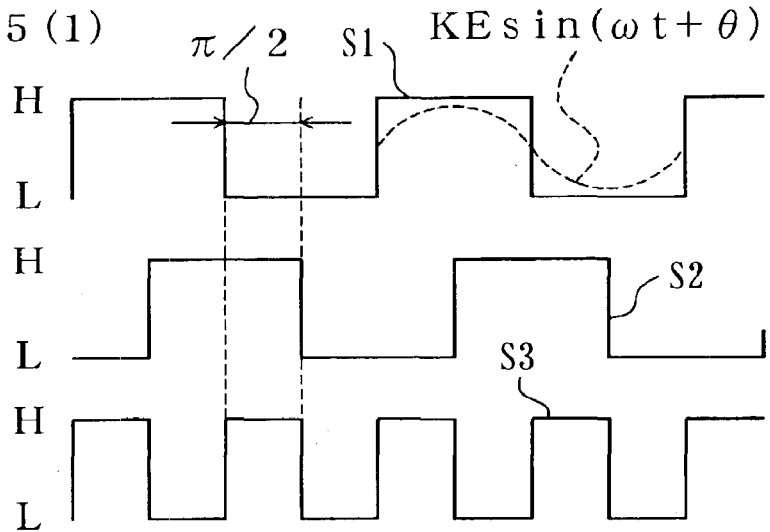
Fig. 5 (2)
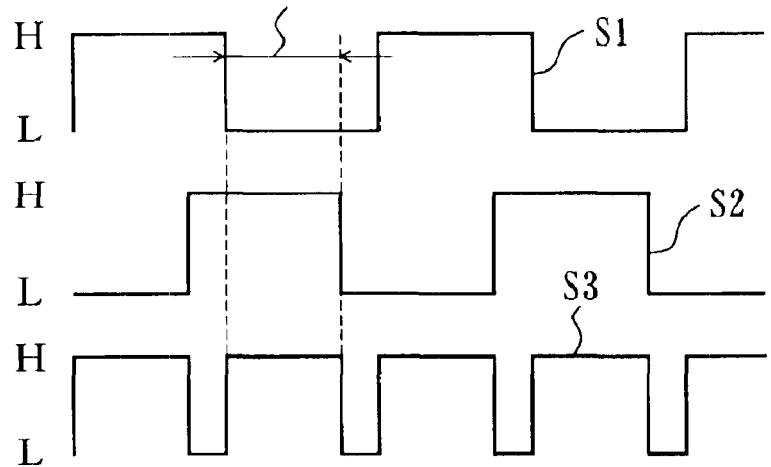
Fig. 5 (3)
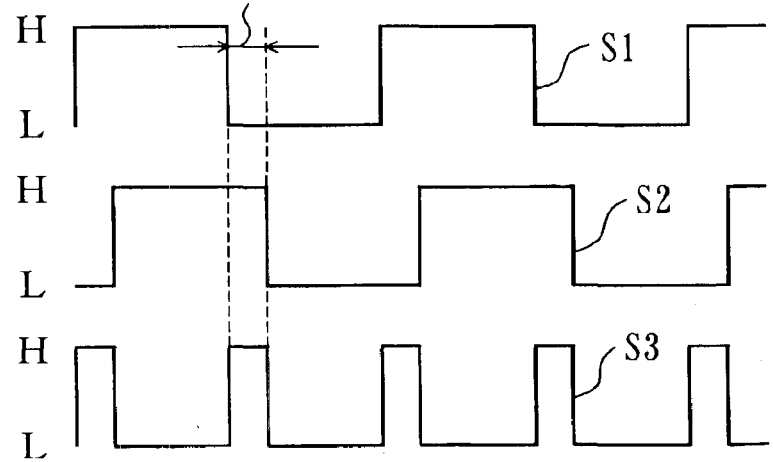

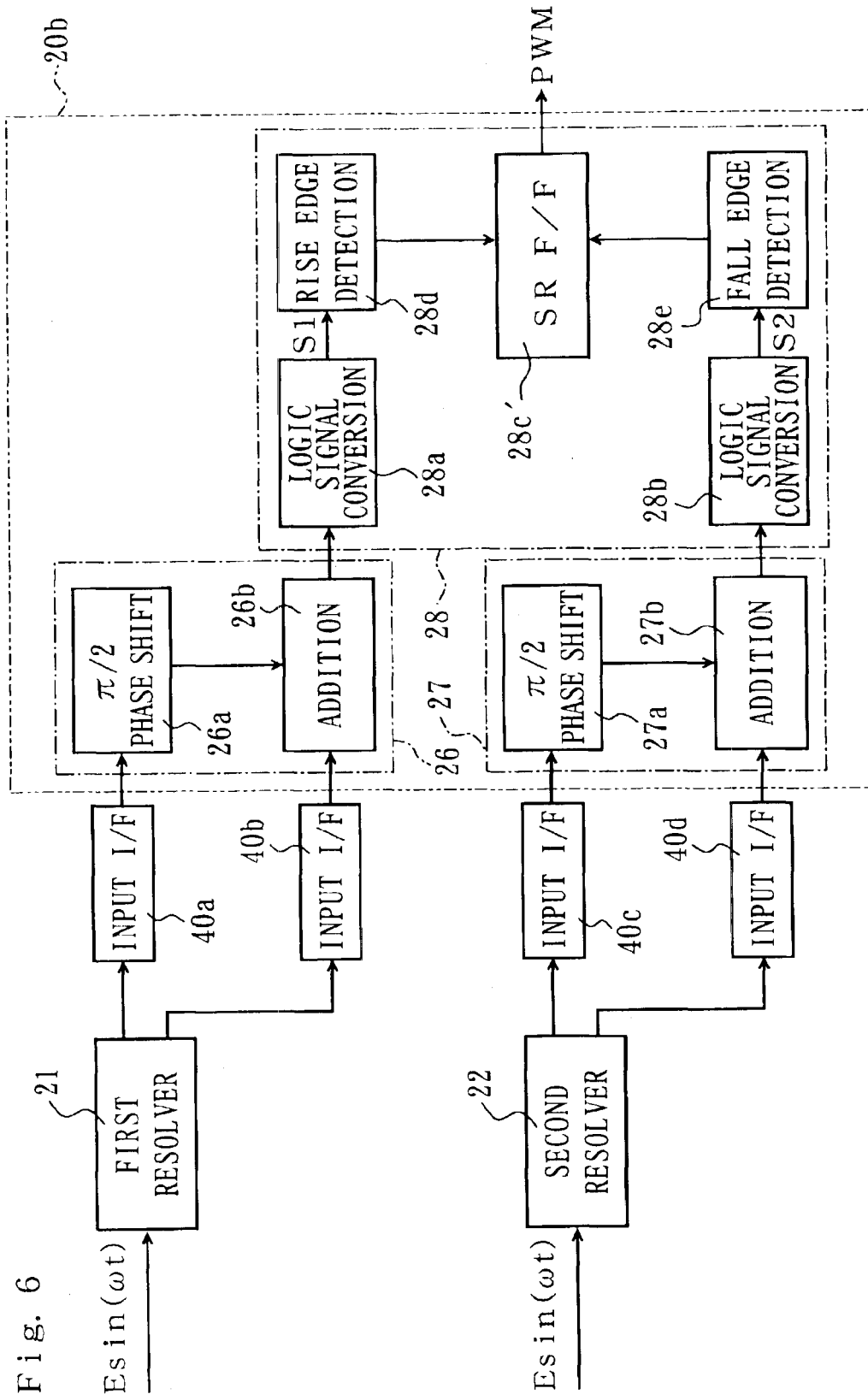

Fig. 10
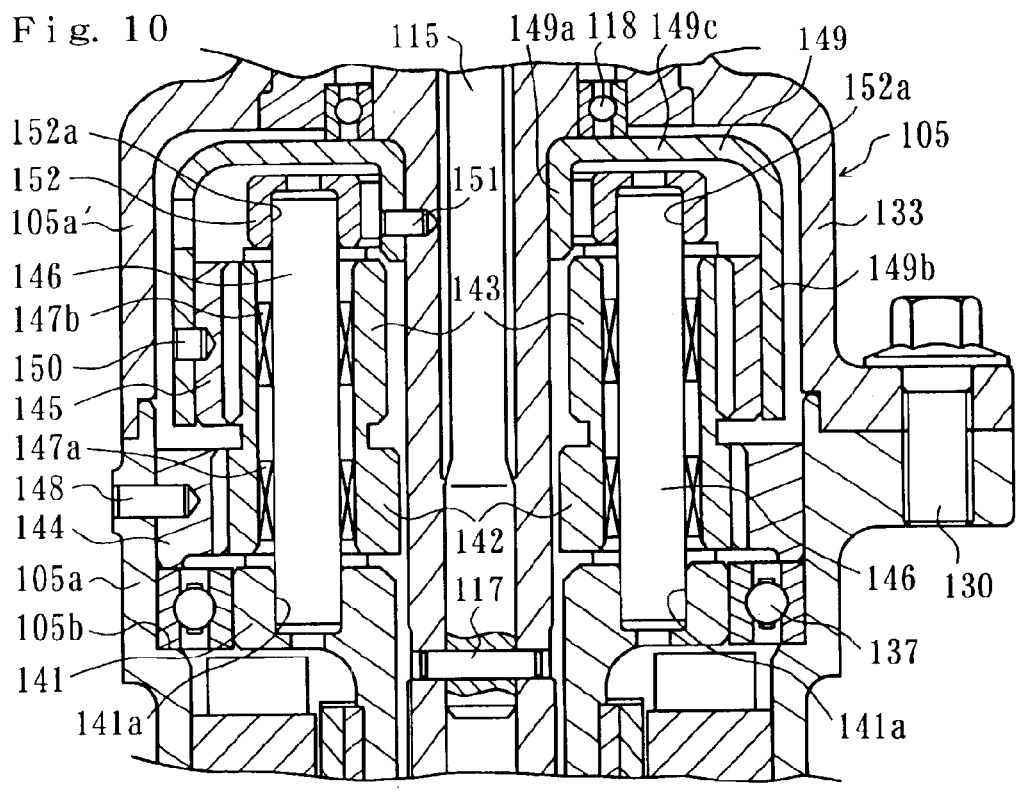
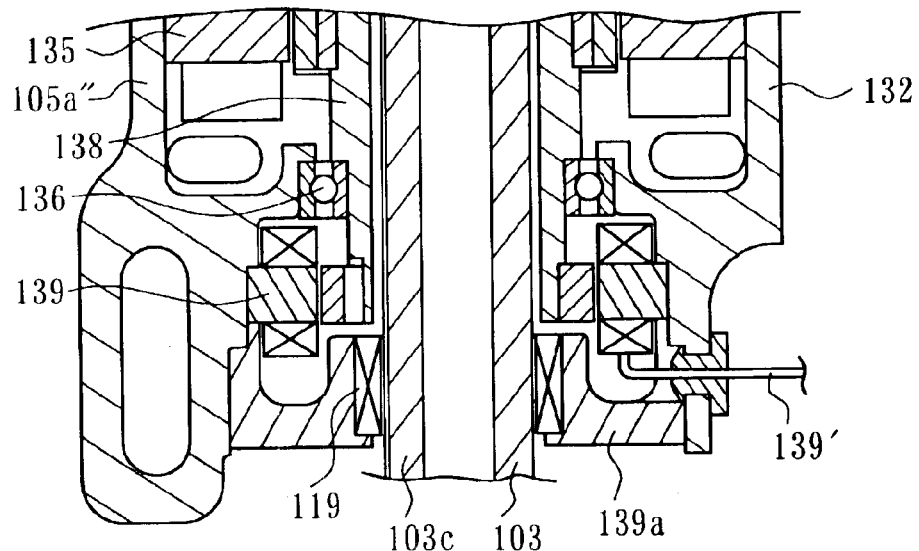

TORQUE SENSOR

FIELD OF THE INVENTION

The present invention relates to a torque sensor suitable for detecting, for example, the steering torque in electric power steering apparatuses.

DESCRIPTION OF THE RELATED ART

A torque sensor is known which comprises a first shaft, a second shaft capable of rotating elastically with respect to the first shaft, a first resolver for detecting the rotation angle of the first shaft, and a second resolver for detecting the rotation angle of the second shaft (Japanese Patent Applications Laid-open Nos. 2001-194251 and 2001-272204). The torque transmitted by the two shafts can be found from the difference between the rotation angle of the first shaft detected by the first resolver and the rotation angle of the second shaft detected by the second resolver.

An alternating signal proportional to $\sin\theta$ and an alternating signal proportional to $\cos\theta$ are output from the two-phase stator windings if a sine signal is input to the rotor winding of the resolver, where $\theta$ stands for a shaft rotation angle detected by the resolver. The rotation angle $\theta$ can be found by using a value obtained by A/D converting the output signals and computing $\tan^{-1}(\sin\theta/\cos\theta)$ with a computer.

However, because a limitation is placed on the resolution of A/D conversion conducted when the alternating signal output from each resolver is A/D converted and introduced to the computer, the torque sensor resolution is restricted. Furthermore, a load associated with signal processing increases as the sampling cycle gets shorter. Moreover, the improvement of torque detection accuracy is hindered because the alternating signal proportional to $\sin\theta$ or $\cos\theta$ changes nonlinearly with the rotation angle $\theta$.

Furthermore, a structure capable of demonstrating a fail-safe function by fault monitoring the torque sensor can be considered in which a torque detection circuit in the torque sensor is composed of two identical dedicated circuits, the difference between the output values of the two circuits is found and a fault signal is output if the difference is no less than a set value. However, when two identical dedicated circuits are used, the size and cost of the torque sensor are increased.

Further, when the transmission torque is found from the difference between the detected rotation angels of the first shaft and the second shaft as in the above-described conventional example, the rotation angle detection with the first resolver and the rotation angle detection with the second detector have to be conducted independently with a high accuracy. For this purpose, the arrangement of each of the first and second resolver stators with respect to the sensor housing, the arrangement of the first resolver rotor with respect to the first shaft, and the arrangement of the second resolver rotor with respect to the second shaft have to be set with a high accuracy. Accordingly, a high machining accuracy of parts and a high assembly accuracy are required and cost is increased. Furthermore, the cost is also increased because the accuracy of resolvers has to be increased in order to find the rotation angle of the first shaft and the rotation angle of the second shaft with a high accuracy.

It is an object of the present invention to provide a torque sensor capable of resolving the above-described problems.

SUMMARY OF THE INVENTION

One aspect of the torque sensor in accordance with the present invention is that the torque sensor comprises a first shaft; a second shaft capable of rotating elastically with respect to the first shaft; a first alternating signal output means for outputting a first alternating signal of which phase changes according to changes in the rotation angle of the first shaft; a second alternating signal output means for outputting a second alternating signal of which phase changes according to changes in the rotation angle of the second shaft; and an output signal processing unit for outputting a phase difference correspondence signal of which waveform changes according to changes in the phase difference between the first alternating signal and second alternating signal, wherein a value corresponding to a torque transmitted by the first and second shafts is found from the phase difference correspondence signal.

In accordance with the present invention, because the phase changes of the first alternating signal correspond to changes in the rotation angle of the first shaft and the phase changes of the second alternating signal correspond to changes in the rotation angle of the second shaft, the phase difference between the first alternating signal and the second alternating signal corresponds to the difference in the rotation angle between the first shaft and the second shaft. The waveform of the phase difference correspondence signal changes according to changes in the difference between the rotation angles, therefore the phase difference correspondence signal can be used as a signal corresponding to the torque transmitted by the first and second shafts. Thus, the difference between rotation angles corresponding to the transmission torque can be found directly without detecting separately the rotation angle of the first shaft and the rotation angle of the second shaft. Therefore, the output values of sine signals or cosine signals are not required to be introduced to find the torque, in difference from the conventional structures, a load associated with signal processing can be reduced, and nonlinear elements can be eliminated.

It is preferred that the first alternating signal output means comprises a first detector and a first signal processing unit; the first detector outputs a first sine amplitude signal represented by $KE\sin(\omega t)\sin\theta$ and a first cosine amplitude signal represented by $KE\sin(\omega t)\cos\theta$, where $KE$ is a coefficient, $\omega$ is an angular frequency of an excitation signal, t is time, and $\theta$ is a rotation angle of the first shaft; the first signal processing unit has a first phase shift circuit producing a first phase shift signal represented by $KE\sin(\omega t+\pi/2)\sin\theta$ by a $\pi/2$ phase shift of the first sine amplitude signal and a first addition circuit producing the first alternating signal represented by $KE\sin(\omega t+\theta)$ by adding up the first phase shift signal and first cosine amplitude signal; the second alternating signal output means comprises a second detector and a second signal processing unit; the second detector outputs a second sine amplitude signal represented by $KE\sin(\omega t)\sin(\theta+\Delta\theta)$ and a second cosine amplitude signal represented by $KE\sin(\omega t)\cos(\theta+\Delta\theta)$, where $KE$ is a coefficient, $\omega$ is an angular frequency of an excitation signal, t is time, and $\theta+\Delta\theta$ is a rotation angle of the second shaft; and the second signal processing unit has a second phase shift circuit producing a second phase shift signal represented by $KE\sin(\omega t+\pi/2)\sin(\theta+\Delta\theta)$ by a $\pi/2$ phase shift of the second sine amplitude signal and a second addition circuit producing the second alternating signal represented by $KE\sin(\omega t+\theta+\Delta\theta)$ by adding up the second phase shift signal and second cosine amplitude signal.

With such a structure, inputting a sine signal into the first and second detectors makes it possible to output the first and second alternating signals of which phase changes according to changes in the rotation angles of the first and second shafts, by using general purpose components such as detectors, e.g., resolvers, phase shift circuits, and addition circuits.

It is preferred that the first alternating signal output means has a first detector for outputting the first alternating signal represented by KE $\sin(\omega t+\theta)$, where KE is a coefficient, $\omega$ is an angular frequency of an excitation signal, t is time, and $\theta$ is a rotation angle of the first shaft; and the second alternating signal output means has a second detector for outputting the second alternating signal represented by KE $\sin(\omega t+\theta+\Delta\theta)$, where KE is a coefficient, $\omega$ is an angular frequency of an excitation signal, t is time, and $\theta+\Delta\theta$ is a rotation angle of the second shaft.

With such a structure, inputting a sine signal and a cosine signal into the first and second detectors makes it possible to output the first and second alternating signals of which phase changes according to changes in the rotation angles of the first and second shafts, by using detectors, such as resolvers, which are the general purpose components.

It is preferred that the first detector and second detector are relatively arranged so that the phase difference between the first alternating signal and second alternating signal becomes a set value when the torque transmitted by the first and second shafts is zero; and the output signal processing unit has a first logic signal conversion circuit for converting the first alternating signal into a first logic signal, a second logic signal conversion circuit for converting the second alternating signal into a second logic signal, and a PWM processing circuit for outputting a PWM signal corresponding to an exclusive OR of the first logic signal and second logic signal as the phase difference correspondence signal.

With such a structure, the PWM signal of which pulse width changes according to changes in the phase difference between the first alternating signal and the second alternating signal can be output as the phase difference correspondence signal. Furthermore, this PWM signal can be output by using general purpose components such as a circuit converting alternating signals into logic signals and a circuit for generating a signal corresponding to an exclusive OR of logic signals.

It is preferred that the output signal processing unit has a first logic signal conversion circuit for converting the first alternating signal into a first logic signal, a second logic signal conversion circuit for converting the second alternating signal into a second logic signal, a circuit for detecting the leading edge of the first logic signal, a circuit for detecting the trailing edge of the second logic signal, and a PWM processing circuit for outputting a PWM signal as the phase difference correspondence signal in which one of the leading edge of the first logic signal and the trailing edge of the second logic signal corresponds to the leading edge of the PWM signal and the other corresponds to the trailing edge of the PWM signal.

With such a structure, the PWM signal of which pulse width changes according to changes in the phase difference between the first alternating signal and second alternating signal can be output as the phase difference correspondence signal. Furthermore, this PWM signal can be output by using general purpose components such as a circuit converting alternating signals into logic signals, a circuit for detecting the leading edge and the trailing edge of logic signals, and, for example, a SR flip-flop for generating signals having a leading edge and a trailing edge corresponding to the leading edge and the trailing edge of logic signals.

An aspect of the present invention relating to a torque sensor provided with a fault monitoring function is that the torque sensor comprises a first shaft; a second shaft capable of rotating elastically with respect to the first shaft; a first detector for outputting an analog signal of which amplitude changes according to changes in the rotation angle of the first shaft; a means for outputting a first alternating signal of which phase changes according to changes in the rotation angle of the first shaft by processing the output signal of the first detector; a second detector for outputting an analog signal of which amplitude changes according to changes in the rotation angle of the second shaft; a means for outputting a second alternating signal of which phase changes according to changes in the rotation angle of the second shaft by processing the output signal of the second detector; an output signal processing unit for outputting a phase difference correspondence signal of which waveform changes according to changes in the phase difference between the first alternating signal and second alternating signal; and a computing device to which the output signal of the first detector, the output signal of the second detector, and the phase difference correspondence signal are input, wherein a reference torque value corresponding to the difference in the rotation angle between the two shafts is found from the output signals of the two detectors, and also the deviation between the detected torque value corresponding to the phase difference correspondence signal and the reference torque value is found with the computing device; and the computing device outputs a fault signal when the absolute value of the deviation is no less than a set value.

The other aspect of the present invention relating to a torque sensor provided with a fault monitoring function is that the torque sensor comprises a first shaft; a second shaft capable of rotating elastically with respect to the first shaft; a first detector for outputting an analog signal of which amplitude changes according to changes in the rotation angle of the first shaft; a means for outputting a first alternating signal of which phase changes according to changes in the rotation angle of the first shaft, by processing the output signal of the first detector without digitizing; a second detector for outputting an analog signal of which amplitude changes according to changes in the rotation angle of the second shaft; a means for outputting a second alternating signal of which phase changes according to changes in the rotation angle of the second shaft, by processing the output signal of the second detector without digitizing; a means for outputting a phase difference correspondence signal of which waveform changes according to changes in the phase difference between the first alternating signal and second alternating signal by processing the first alternating signal and second alternating signal without digitizing; a means for finding a reference torque value corresponding to the difference in the rotation angle between the two shafts from the values obtained by A/D converting the output signals of the two detectors; a means for finding the deviation between the detected torque value corresponding to the phase difference correspondence signal and the reference torque value; and a means for outputting a fault signal when the absolute value of the deviation is no less than a set value.

Because the reference torque value corresponding to the difference in the rotation angle between the two shafts corresponds to the torque transmitted by the two shafts, the torque sensor can be decided to be in a normal or abnormal state when the absolute value of the deviation of the detected torque value from the reference torque value is less or no less than a set value, respectively.

Computing the reference torque value required for fault monitoring the torque sensor with the computing device eliminates the need to provide a plurality of output signal processing units for outputting phase difference correspondence signals corresponding to the detected torque values, obviates the necessity for dedicated circuits for fault monitoring the torque sensor, and makes it possible to decrease the size of the torque sensor.

Because the phase difference correspondence signals are output by processing the analog output signal of the first detector and the analog output signal of the second detector without digitizing, the resolution of the torque sensor can be increased without increasing the load of computing by comparison with the case when a value corresponding to the torque transmitted by the two shafts is found from the value obtained by A/D converting and introducing the output signals of each detector. Furthermore, although the reference torque value is found from the value obtained by A/D conversion of the output signals of the two detectors, it is sufficient if this reference torque value is used for fault monitoring the torque sensor, therefore, it is not necessary to find this value with a high accuracy. Thus, there is no need to reduce the sampling cycle for introducing the A/D converted values more than required. Therefore, the load of computing is not increased.

Another aspect of the torque sensor in accordance with the present invention is that the torque sensor comprises a first shaft; a second shaft capable of rotating elastically with respect to the first shaft; a first alternating signal output means for outputting a first alternating signal of which phase changes according to changes in the rotation angle of the first shaft; a second alternating signal output means for outputting a second alternating signal of which phase changes according to changes in the rotation angle of the second shaft; an output signal processing unit for outputting a phase difference correspondence signal of which waveform changes according to changes in the phase difference between the first alternating signal and second alternating signal; a sensor housing; the first alternating signal output means having a first detector, and the second alternating signal output means having a second detector; the first detector having a first detector rotor and a ring-like first detector stator covering the first detector rotor; the second detector having a second detector rotor and a ring-like second detector stator covering the second detector rotor; the first shaft being pressed in the first detector rotor, the second shaft being pressed in the second detector rotor, and the first detector stator and the second detector stator being fixed with respect to the sensor housing; and a value corresponding to the torque transmitted by the first and second shafts being found from the phase difference correspondence signal, wherein a first recess is formed in one of the inner periphery of the first detector rotor and the outer periphery of the first shaft, and a first protrusion which is to be fit from the axial direction of the first and second shafts via a clearance in the rotation direction of the first and second shafts into the first recess is formed in the other of the inner periphery of the first detector rotor and the outer periphery of the first shaft; a second recess is formed in one of the inner periphery of the second detector rotor and the outer periphery of the second shaft, and a second protrusion which is to be fit from the axial direction via a clearance in the rotation direction into the second recess is formed in the other of the inner periphery of the second detector rotor and the outer periphery of the second shaft; a tubular spacer is arranged between the first detector stator and the second detector stator; a third recess is formed in one of the first detector stator and the spacer, and a third protrusion which is to be fit from the axial direction via a clearance in the rotation direction into the third recess is formed in the other of the first detector stator and the spacer; and a fourth recess is formed in one of the second detector stator and the spacer, and a fourth protrusion which is to be fit from the axial direction via a clearance in the rotation direction into the fourth recess is formed in the other of the second detector stator and the spacer.

The clearance in each rotation direction is, for example, about 0.05 mm.

In accordance with this aspect of the present invention, the position of the first detector rotor relative to the first shaft in the rotation direction is set by fitting the first protrusion into the first recess, the position of the second detector rotor relative to the second shaft in the rotation direction is set by fitting the second protrusion into the second recess, and the position of the first detector stator relative to the second detector stator in the rotation direction is set by fitting the third protrusion into the third recess and by fitting the fourth protrusion into the fourth recess. As a result, approximately setting of the position of the first shaft relative to the second shaft in the rotation direction makes it possible to set approximate setting of the positions of the first detector relative to the second detector in the rotation direction.

The third protrusion and the fourth protrusion can be formed monolithically with the spacer, or can be the members separate from the spacer. For example, a pin is inserted into a through hole formed in a ring-like spacer, one end of the pin protruding from one end surface of the spacer is used as the third protrusion, and the other end of the pin protruding from the other end surface is used as the fourth protrusion.

From the standpoint of saving space, it is preferred that the signal cables of the two detectors is led from between the two detectors to the outside of the sensor housing via a notch formed in the sensor housing.

It is preferred that the torque sensor comprises a detector pushing member which is pressed in the sensor housing from the axial direction, wherein the first detector stator, second detector stator, and spacer are fitted to the inner periphery of the sensor housing from the axial direction via a clearance in the radial direction of the first and second shafts; and the two detector stators and spacer are sandwiched between the detector pushing member and a step formed on the inner periphery of the sensor housing.

With such a structure, the first and second detector stators and the spacer can be easily fit into the sensor housing and fixed with respect to the sensor housing by merely pressing the detector pushing members in the sensor housing.

The press-in load of the detector pushing member can be set small to facilitate assembling and part of the detector pushing member can be caulked after pressing to cause plastic deformation and attachment to the sensor housing. Furthermore, the detector pushing members can be of a ring-like shape and the second shaft can be supported by the inner periphery thereof via a bearing. As a result, adjusting the inner diameter of the detector pushing members allows the outer diameter of the support bearing of the second shaft to be made equal to the outer diameter of the support bearing of the first shaft. Thus, the support bearing of the first shaft and the support bearing of the second shaft can be of the same model and cost can be reduced.

It is preferred that the first shaft and second shaft are connected via an elastic member; a central recess is formed in the end surface of one of the first shaft and the second shaft so that shaft axis center passing through it, and the end portion of the other of the first shaft and the second shaft is inserted as an insertion portion into the central recess; relative rotation of the first and second shafts is limited to a fixed range by mutual contact of a rotation-restricting surface formed on the inner periphery of the central recess and a rotation-restricting surface formed on the outer periphery of the insertion portion due to the relative rotation; and the inner periphery of the central recess and the outer periphery of the insertion portion face to each other via a space over the entire region till the relative rotation of the two shafts is limited.

With such a structure, when the insertion portion of the shaft is inserted into the central recess in the shaft for limiting the relative rotation of the two shafts to prevent the elastic member from damage, the mutual arrangement of the two shafts in the rotation direction can be set approximately in the center of the relative rotation range, thereby making it possible to set easily the approximate mutual arrangement of the two shafts in the rotation direction. Furthermore, because the inner periphery of the central recess and the outer periphery of the insertion portion face each other via a space over the entire region till the relative rotation of the two shafts is limited, no friction occurs between the two shaft. Therefore, hysteresis of the alternating signals of each detector can be prevented, and deterioration of steering feeling can be prevented when the torque sensor according to the present invention is used in an electric power steering apparatus.

It is preferred that a ring-like magnetic shielding part extending inwardly from the inner periphery of the spacer is formed from a magnetic shielding material integrally with the spacer, and magnetic shielding between the first detector and second detector is conducted by the magnetic shielding part.

With such a structure, the spacer and the magnetic shielding part are integrated, the number of parts is reduced, and the number of assembly operations is decreased, thereby allowing for reduced cost.

According to the present invention, a highly accurate torque sensor which makes possible the increase in resolution without raising the load of computing can be provided at a low cost. Furthermore, eliminating unnecessary dedicated circuits for fault monitoring results in a reduced size. Moreover, a torque sensor that is manufactured at a low cost can be provided without requiring a high accuracy of parts machining and assembling.

BRIEF DESCRIPTION OF THE DRAWINGS

FIGS. 5(1) through 5(3) relate to the torque sensor of the first embodiment of the present invention. FIG. 5(1) illustrates the first logic signal, second logic signal, and PWM signal in the case when the transmission torque is zero. FIG. 5(2) illustrates the first logic signal, second logic signal, and PWM signal in the case when the torque is transmitted in one direction. FIG. 5(3) illustrates the first logic signal, second logic signal, and PWM signal in the case when the torque is transmitted in the other direction.

FIG. 6 is an explanatory view illustrating the partial structure of the torque sensor of the modification example of the present invention;

FIG. 7(1) illustrates the first logic signal, second logic signal, PWM signal, leading edge detection signal, and trailing edge detection signal in the case when the transmission torque is zero. FIG. 7(2) illustrates the first logic signal, second logic signal, and PWM signal in the case when the torque is transmitted in one direction. FIG. 7(3) illustrates the first logic signal, second logic signal, and PWM signal in the case when the torque is transmitted in the other direction.

FIG. 10 is a cross-sectional view of an electric actuator in the electric power steering apparatus equipped with the torque sensor of the second embodiment of the present invention;

DESCRIPTION OF THE PREFERRED EMBODIMENTS

Figure 1:
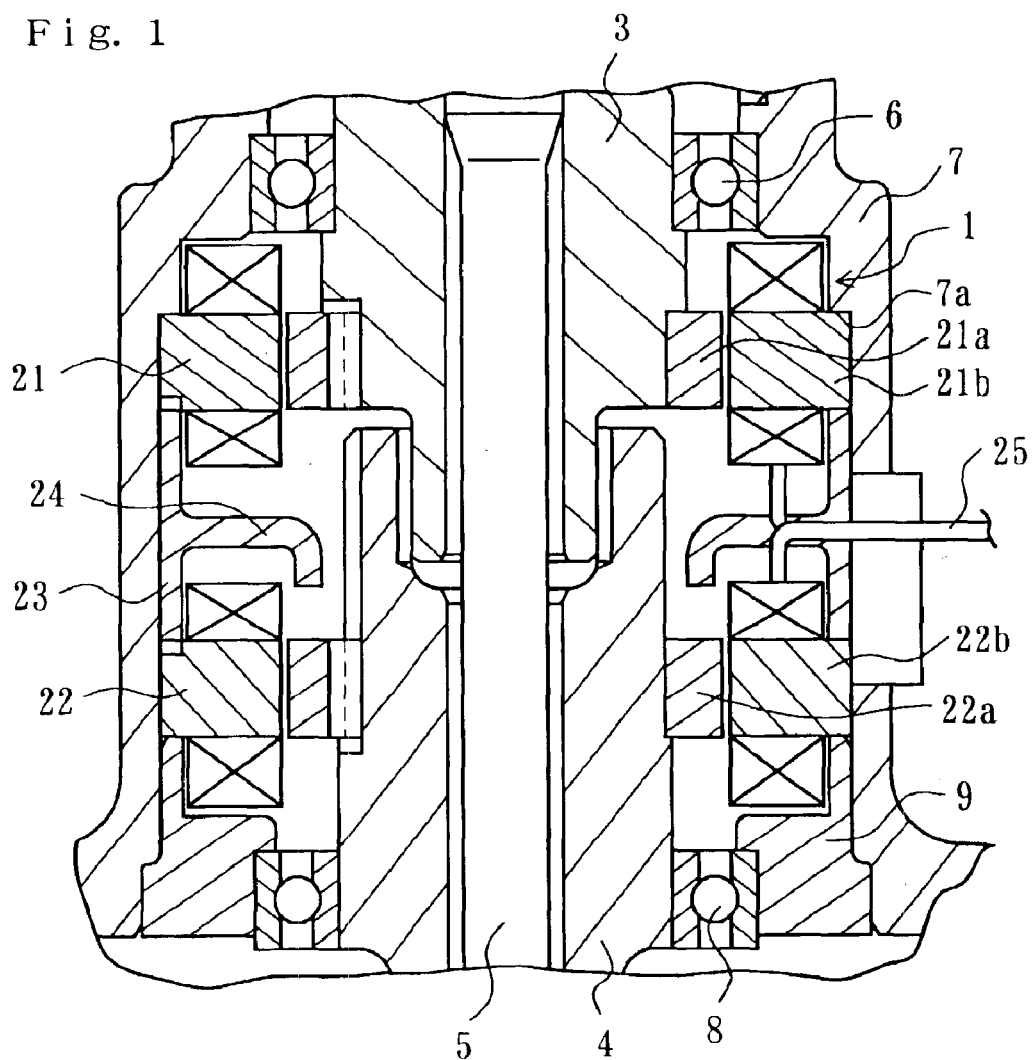
FIG. 1 is a cross-sectional view of a torque sensor of the first embodiment of the present invention.

A torque sensor 1 of the first embodiment illustrated by FIG. 1 is used for detecting the torque transmitted by a steering shaft of an electric power steering apparatus, and comprises a first tubular shaft 3 and a second tubular shaft 4 which are used as parts of the steering shaft. The rotation of a steering wheel (not shown in the figure) connected to the first shaft 3 is transmitted to the vehicle wheels via a steering gear (not shown in the figure) connected to the second shaft 4, thereby changing the steering angle of the vehicle.

A torsion bar (elastic member) 5 is inserted in the first shaft 3 and the second shaft 4. One end of the torsion bar 5 is connected to the first shaft 3 with a pin or serration, and the other end is connected to the second shaft 4 with a pin or serration. As a result, the first shaft 3 and the second shaft 4 can rotate elastically with respect to each other around the same axis. The first shaft 3 is supported by a sensor housing 7 via a bearing 6, and the second shaft 4 is supported via a bearing 8 by a ring-like resolver pushing member 9 pressed in the sensor housing 7. A first resolver (first detector) 21 and a second resolver (second detector) 22 are covered by the sensor housing 7.

The first resolver 21 comprises a first resolver rotor 21*a* fitted to the outer periphery of the first shaft 3 so as to rotate together therewith and a ring-like first resolver stator 21*b* covering the first resolver rotor 21*a*. In the present embodiment, the first resolver rotor 21*a* and the first shaft 3 rotate together because the first shaft 3 is pressed in the first resolver rotor 21*a*. The second resolver 22 comprises a second resolver rotor 22*a* fitted to the outer periphery of the second shaft 4 so as to rotate together therewith, and a ring-like second resolver stator 22b covering the second resolver rotor 22a. In the present embodiment, the second resolver rotor 22a and the second shaft 4 rotate together because the second shaft 4 is pressed in the second resolver rotor 22a. A tubular spacer 23 is disposed between the first resolver stator 21b and the second resolver stator 22b.

The first resolver stator 21b, the second resolver stator 22b, and the spacer 23 are fitted to the inner periphery of the sensor housing 7 from the shaft axial direction with a clearance in the radial direction of the first and second shafts 3, 4. The two resolver stators 21b, 22b and the spacer 23 are fixed to the sensor housing 7 by being sandwiched between the resolver pushing member 9 and a step 7a formed on the inner periphery of the sensor housing 7. A ring-like magnetic shield part 24 extending inwardly from the inner periphery of the spacer 23 is formed from a magnetic shielding material integrally with the spacer 23. Magnetic shielding between the first resolver 21 and the second resolver 22 is conducted by the magnetic shielding part 24.

The first resolver 21 outputs a first sine amplitude signal and a first cosine amplitude signal each of which is an analog alternating signal of which amplitude changes according to changes in the rotation angle of the first shaft 3. Thus, when an exciting signal is input to a winding (not shown in the figures) provided on the first resolver rotor 21a, the first sine amplitude signal and the first cosine amplitude signal are output from two phase windings (not shown in the figures) provided on the first resolver stator 21b. The first sine amplitude signal can be represented by KE sin($\omega$t)sin $\theta$, where the exciting signal is denoted by E sin($\omega$t) and the rotation angle of the first shaft 3 is denoted by $\theta$, and the amplitude KE sin $\theta$ changes according to changes in the rotation angle $\theta$. Furthermore, the first cosine amplitude signal can be represented by KE sin($\omega$t)cos $\theta$ and the amplitude KE cos $\theta$ changes according to changes in the rotation angle $\theta$. In those formulas, E is a voltage amplitude, K is a transformation ratio, $\omega$ is an angular frequency of excitation, and t is time.

The second resolver 22 outputs a second sine amplitude signal and a second cosine amplitude signal each of which is an analog alternating signal of which amplitude changes according to changes in the rotation angle of the second shaft 4. Thus, when an exciting signal is input to a winding (not shown in the figures) provided on the second resolver rotor 22a, the second sine amplitude signal and the second cosine amplitude signal are output from two phase windings (not shown in the figures) provided on the second resolver stator 22b. The second sine amplitude signal can be represented by KE sin($\omega$t)sin($\theta$+$\Delta\theta$), where the exciting signal is denoted by E sin($\omega$t) and the rotation angle of the second shaft 4 is denoted by $\theta$+$\Delta\theta$, and the amplitude KE sin($\theta$+$\Delta\theta$) changes according to changes in the rotation angle $\theta$. Furthermore, the second cosine amplitude signal can be represented by KE sin($\omega$t)cos($\theta$+$\Delta\theta$) and the amplitude KE cos($\theta$+$\Delta\theta$) changes according to changes in the rotation angle $\theta$.

Figure 2:
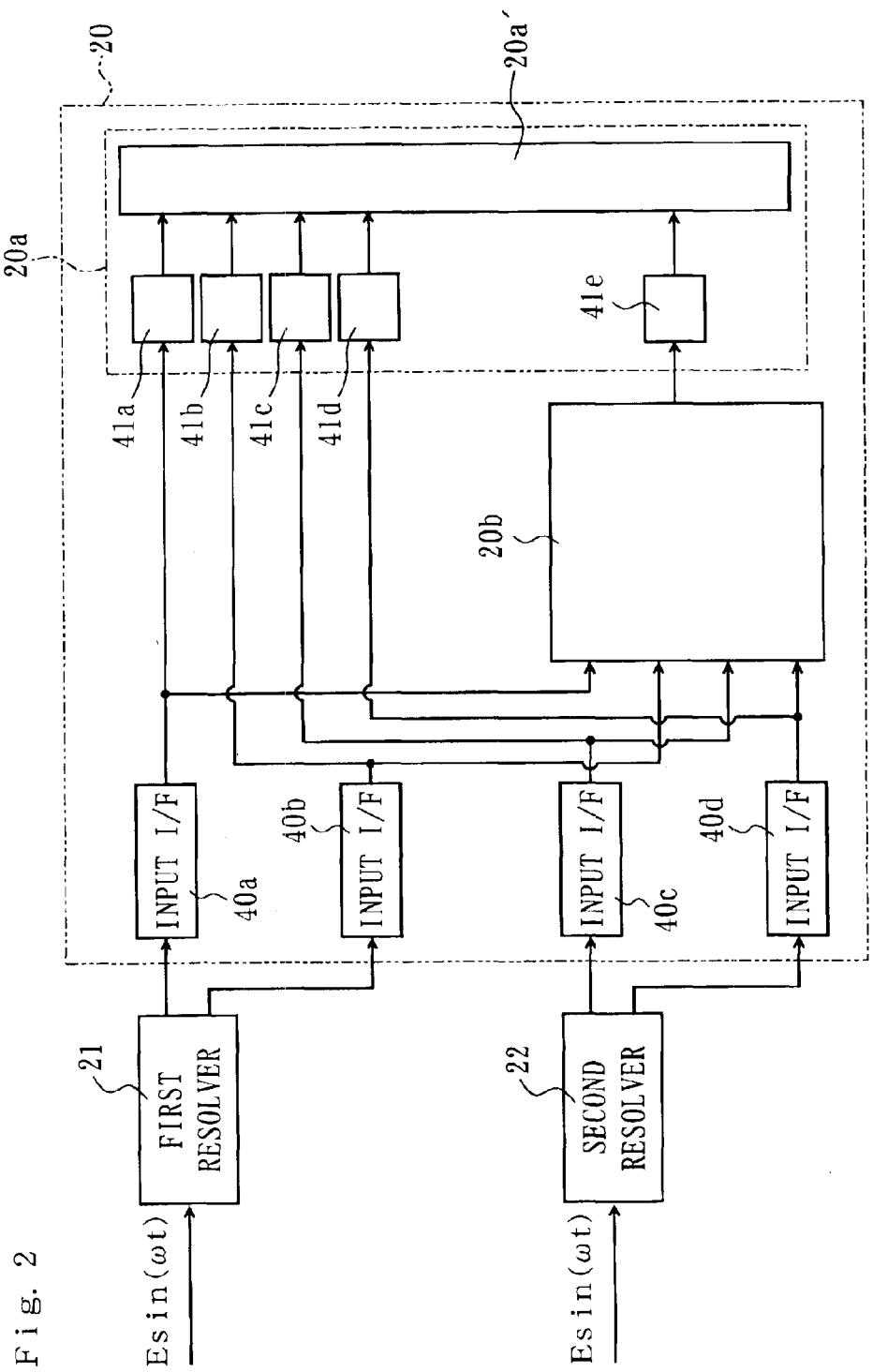
FIG. 2 is an explanatory view illustrating the structure of the torque sensor of the first embodiment of the present invention.
Figure 3:
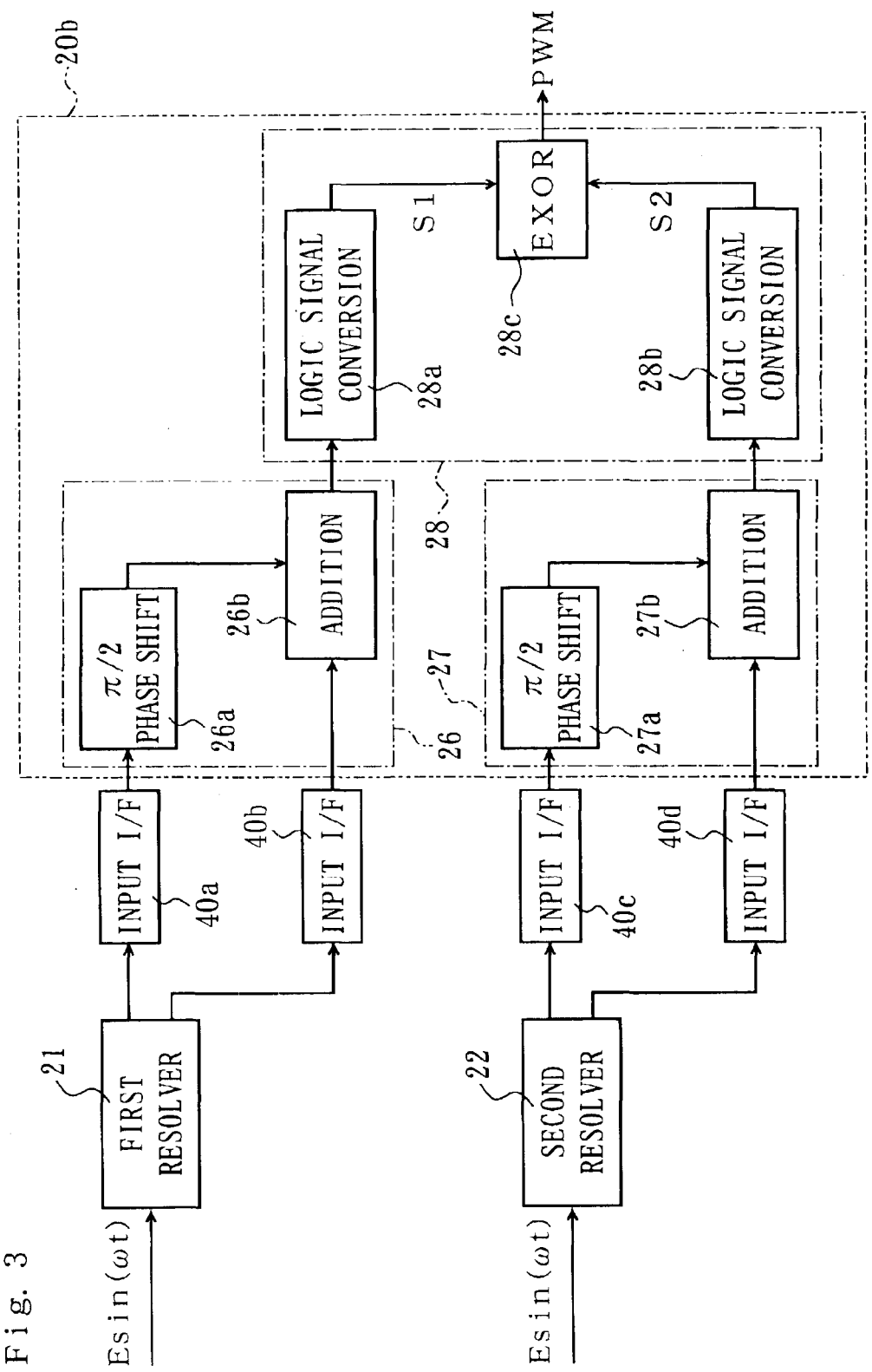
FIG. 3 illustrates the structure of a signal processing unit in the torque sensor of the first embodiment of the present invention.

The output signals of the two resolvers 21, 22 are input via signal cables 25 to a control unit 20 shown in FIG. 2, which is provided on the outside of the sensor housing 7. The control unit 20 comprises an computing device 20a and a signal processing device 20b for torque detection. The computing device 20a comprises a known microcomputer 20a' and A/D converters 41a, 41b, 41c, 41d, 41e. The signal processing device 20b for torque detection comprises, as shown in FIG. 3, a first signal processing unit 26, a second signal processing unit 27, and an output signal processing unit 28. The computing device 20a is connected to the output signal processing unit 28.

The computing device 20a finds a reference torque value corresponding to the difference in the rotation angle between the two shafts 3, 4 from the output signals of the two resolvers 21, 22. To be more precise, from the first resolver 21 to the microcomputer 20a', the above-mentioned first sine amplitude signal is sent via the input interface 40a and the A/D converter 41a, and the above-mentioned first cosine amplitude signal is sent via the input interface 40b and the A/D converter 41b. From the second resolver 22 to the microcomputer 20a', the above-mentioned second sine amplitude signal is sent via the input interface 40c and the A/D converter 41c, and the above-mentioned second cosine amplitude signal is sent via the input interface 40d and the A/D converter 41d. The computing device 20a computes the rotation angle of the first shaft 3 from the inverse tangent of the quotient of the amplitude value obtained by A/D conversion of the first sine amplitude signal divided by the amplitude value obtained by A/D conversion of the first cosine amplitude signal, and computes the rotation angle of the second shaft 4 from the inverse tangent of the quotient of the amplitude value obtained by A/D conversion of the second sine amplitude signal divided by the amplitude value obtained by A/D conversion of the second cosine amplitude signal. For example, the computing device 20a computes the rotation angle of the first shaft 3 from $\tan^{-1}(\sin\theta/\cos\theta)$ and the rotation angle of the second shaft 4 from $\tan^{-1}(\sin(\theta+\Delta\theta)/\cos(\theta+\Delta\theta))$, where $\theta$ stands for a rotation angle of the first shaft 3 and $\theta+\Delta\theta$ stands for a rotation angle of the second shaft 4. In this process, values corresponding to those sin $\theta$, cos $\theta$, sin($\theta$+$\Delta\theta$), cos($\theta$+$\Delta\theta$) are found by A/D conversion of the output signals of the two resolvers 21, 22. The computing device 20a finds the reference torque value corresponding to the difference in the computed rotation angles between the two shafts 3, 4, from a predetermined and stored relationship between the difference in the rotation angles and the torque transmitted by the two shafts 3, 4.

Figure 4:
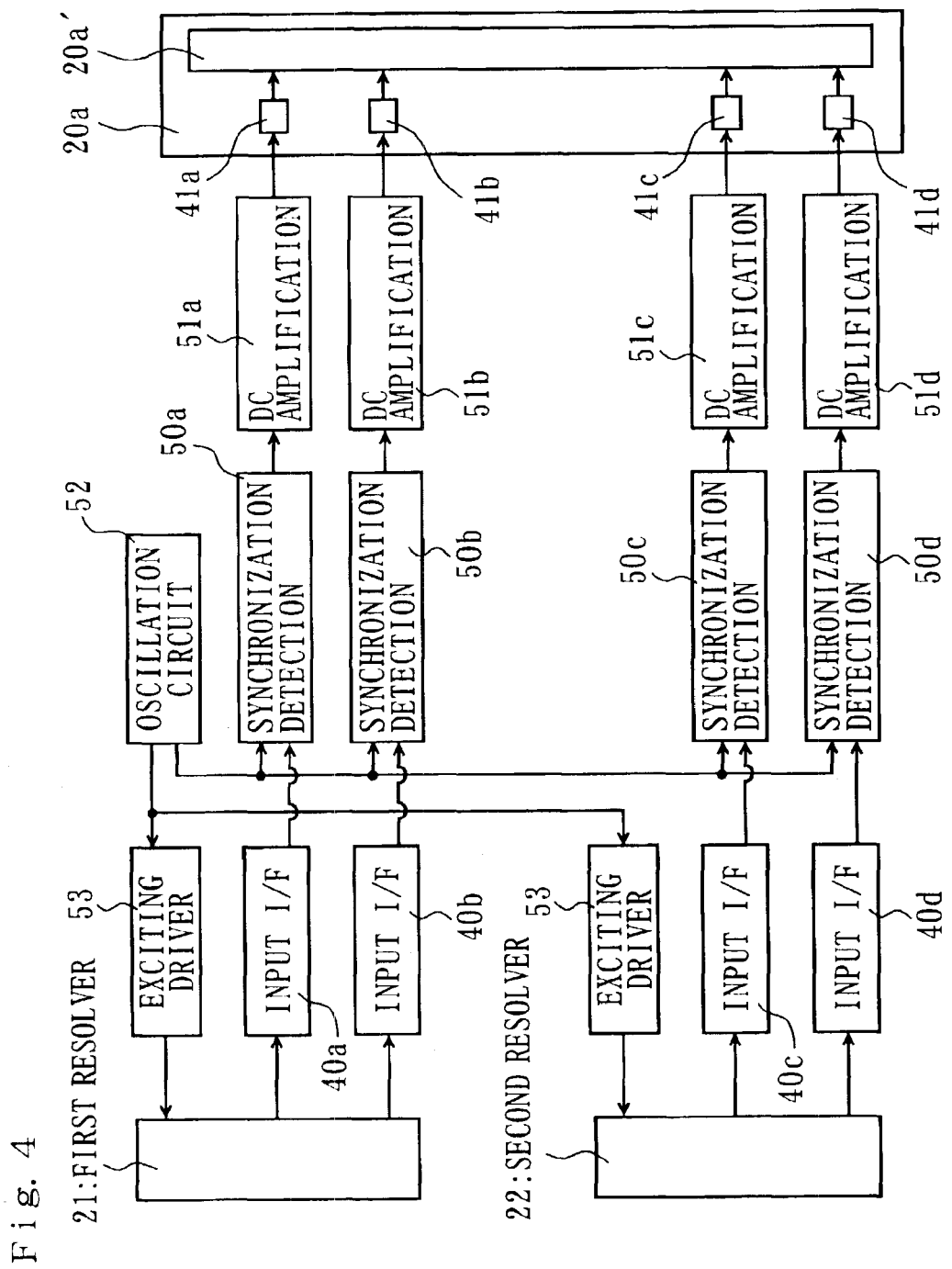
FIG. 4 is an explanatory view illustrating the partial structure of the torque sensor of a modification example of the present invention.

Alternatively, a signal processing circuit for conducting synchronous detection with the exciting signals of the resolvers 21, 22 as the reference signals can be used for A/D converting the output signals of the resolvers 21, 22. To be more precise, as shown by the modification example in FIG. 4, synchronization detection circuits 50a, 50b, 50c, 50d and DC amplification circuits 51a, 51b, 51c, 51d are introduced between the microcomputer 20a' and the respective input interfaces 40a, 40b, 40c, 40d, and the exciting signals input to resolvers 21, 22 from an oscillation circuit 52 via an excitation driver 53 are input to the synchronization detection circuits 50a, 50b, 50c, 50d. In the synchronization detection circuits 50a, 50b, 50c, 50d, values corresponding to sin $\theta$, cos $\theta$, sin($\theta$+$\Delta\theta$), cos($\theta$+$\Delta\theta$) in the output signals of the resolvers 21, 22 are found by conducting synchronous detection with the exciting signals serving as the reference signals.

The reference torque value can be found from a value obtained by deducting the product of the amplitude value of the first cosine amplitude signal and the amplitude value of the second sine amplitude signal from the product of the amplitude value of the first sine amplitude signal and the amplitude value of the second cosine amplitude signal. In other words, because sin $\theta\cdot$cos($\theta$+$\Delta\theta$)−cos $\theta\cdot$sin($\theta$+$\Delta\theta$)=sin$^2$($\Delta\theta$), the reference torque value corresponding to the difference $\Delta\theta$ in the rotation angles between the two shafts 3, 4 can be found from the inverse tangent of the square root of the value.

Referring to FIG. 3, the first signal processing unit 26 of the signal processing device 20b for torque detection comprises a first phase shift circuit 26a and a first addition circuit 26b, and outputs the first alternating signal of which phase changes according to changes in the rotation angle of the first shaft 3 by conducting the signal processing of the output signals of the first resolver 21 without digitizing. Thus, the first phase shift circuit 26a produces a first phase shift signal represented by KE sin(ωt+π/2)sin θ, by conducting a π/2 phase shift of the first sine amplitude signal sent from the first resolver 21 via the input interface 40a. The first addition circuit 26b adds up this first phase shift signal and the first cosine amplitude signal sent from the first resolver 21 via the input interface 40b so as to produce the first alternating signal represented by KE sin(ωt+π/2)sin θ+KE sin(ωt)cos θ=KE cos(ωt)sin θ+KE sin(ωt)cos θ=KE sin(ωt+θ). Means for outputting the first alternating signal is thus constituted.

The second signal processing unit 27 comprises a second phase shift circuit 27a and a second addition circuit 27b, and outputs the second alternating signal of which phase changes according to changes in the rotation angle of the second shaft 4 by conducting the signal processing of the output signals of the second resolver 22 without digitizing. Thus, the second phase shift circuit 27a produces a second phase shift signal represented by KE sin(ωt+π/2)sin(θ+Δθ), by conducting a π/2 phase shift of the second sine amplitude signal sent from the second resolver 22 via the input interface 40c. The second addition circuit 27b adds up this second phase shift signal and the second cosine amplitude signal sent from the second resolver 22 via the input interface 40d so as to produce the second alternating signal represented by KE sin(ωt+π/2)sin(θ+Δθ)+KE sin(ωt)cos(θ+Δθ)=KE cos(ωt)sin (θ+Δθ)+KE sin(ωt)cos(θ+Δθ)=KE sin(ωt+θ+Δθ). Means for outputting the second alternating signal is thus instituted.

The first resolver 21 and the second resolver 22 are relatively arranged so that the phase difference between the first alternating signal and second alternating signal becomes π/2 when the torque transmitted by the first and second shafts 3, 4 is zero.

The output signal processing unit 28 comprises a first logic signal conversion circuit 28a, a second logic signal conversion circuit 28b, and a PWM processing circuit 28c.

The first logic signal conversion circuit 28a converts the first alternating signal into a first logic signal. The first logic signal is represented by a square wave with two levels, H and L, and a frequency equal to that of the first alternating signal. The second logic signal conversion circuit 28b converts the second alternating signal into a second logic signal. The second logic signal is represented by a square wave with two levels, H and L, and a frequency equal to that of the second alternating signal. The phase difference between the first alternating signal and the second alternating signal is set equal to the phase difference between the first logic signal and the second logic signal.

The PWM processing circuit 28c outputs a PWM signal corresponding to an exclusive OR (EXOR) of the first logic signal and the second logic signal. In the present embodiment, the PWM duty ratio found from the PWM signal is used as the value corresponding to the torque transmitted by the first and second shafts 3, 4. To be more precise, FIG. 5(1) shows a first logic signal S1, a second logic signal S2, and a PWM signal S3 output from the PWM processing circuit 28c in the case when the transmission torque is zero. In this case, the phase difference between the first logic signal S1 and the second logic signal S2 is π/2 and the PWM duty ratio is 50%. FIG. 5(2) shows the first logic signal S1, the second logic signal S2, and the PWM signal S3 in the case when a torque in one direction is transmitted by the first and second shafts 3, 4. In this case, the phase difference between the first logic signal S1 and the second logic signal S2 is π/2+Δθ(Δθ>0), and the larger is the transmission torque, the higher is the PWM duty ratio above 50%. FIG. 5(3) shows the first logic signal S1, the second logic signal S2, and the PWM signal S3 in the case when a torque in the other direction is transmitted by the first and second shafts 3, 4. In this case, the phase difference between the first logic signal S1 and the second logic signal S2 is π/2+Δθ(Δθ<0), and the larger is the transmission torque, the lower is the PWM duty ratio below 50%.

The phase changes of the first alternating signal correspond to the changes in the rotation angle of the first shaft 3, and the phase changes of the second alternating signal correspond to the changes in the rotation angle of the second shaft 4. Therefore, the phase difference between the first alternating signal and the second alternating signal corresponds to the transmission torque corresponding to the difference in the rotation angle between the two shafts 3, 4. Because the phase difference between the first alternating signal and the second alternating signal is equal to the phase difference between the first logic signal S1 and the second logic signal S2, the PWM signal S3 corresponding to the exclusive OR of the first logic signal S1 and the second logic signal S2 is a phase difference correspondence signal. The pulse width, that is, waveform of the phase difference correspondence signal changes according to changes in the phase difference between the first alternating signal and the second alternating signal. In other words, the output signal processing unit 28 outputs the PWM signal S3 which is the phase difference correspondence signal by processing the first alternating signal and the second alternating signal without digitizing. The PWM signal S3 can be used as the signal corresponding to the torque transmitted by the first and second shafts 3, 4.

The computing device 20a finds the detected torque value corresponding to the PWM duty ratio from the predetermined and stored relationship between the PWM duty ratio found from the PWM signal S3 and the transmission torque corresponding to the difference in the rotation angle between the two shafts 3, 4, and finds the deviation of this detected torque value from the reference torque value. Further, the computing device 20a conducts fault monitoring of the torque sensor 1 by making a decision as to whether the absolute value of this deviation is no less than a predetermined set value. To be more precise, the computing device 20a outputs a fault signal when the absolute value of this deviation is no less than the set value, and outputs a control signal corresponding to the detected torque value when the absolute value of this deviation is less than the set value. This fault signal, for example, activates alarm means such as a lamp or the like, or cancels the control of an electric actuator for generating the steering assisting force. The steering assisting force of the electric power steering device is controlled by the control signal corresponding to the detected torque value. In other words, the computing device 20a computes the steering assisting force corresponding to the detected torque value from the predetermined and stored relationship between the PWM duty ratio and the steering assisting force, and controls the electric actuator (not shown in the figures) for generating the steering assisting force so as to generate the computed steering assisting force. A known electric actuator for generating the steering assisting force can be used for this purpose. For example, a device can be used in which the steering assisting force generated by an electric motor is transmitted to a steering shaft via a reduction gear mechanism.

According to the above-described embodiment, the difference in the rotation angle corresponding to the transmission torque can be found directly by the signal processing device 20*b* for torque detection, without detecting independently the rotation angle of the first shaft 3 and the rotation angle of the second shaft 4. As a result, the detected torque value corresponding to the transmission torque can be found without digitizing and introducing the alternating signal output proportional to sine value and cosine value. Therefore, the load of computing for signal processing can be reduced and non-linear elements can be eliminated. The first and second alternating signals can be output by employing general purpose components, such as resolvers 21, 22, phase shift circuits 26*a*, 27*a*, and addition circuits 26*b*, 27*b*. Furthermore, the PWM signal of which pulse width changes according to changes in the phase difference between the first alternating signal and the second alternating signal can be output by employing general purpose components such as logic signal conversion circuits 28*a*, 28*b* for converting alternating signals into logic signals and the PWM processing circuit 28*c* for generating a signal corresponding to the exclusive OR of logic signals.

Further, the reference torque value corresponding to the difference in the rotation angle between the two shafts 3, 4 corresponds to the torque transmitted by the two shafts 3, 4. Therefore, a decision can be made that the torque sensor 1 is in a normal state if the absolute value of the deviation of the detected torque value from the reference torque value is less than the set value and that the torque sensor 1 is in an abnormal state if it is no less than the set value.

Computing the reference torque value needed for fault monitoring the torque sensor 1 with the computing device 20*a* makes it unnecessary to provide a plurality of output signal processing units 28 for outputting the signals corresponding to phase difference that correspond to the detected torque. Therefore, no dedicated circuit is required for fault monitoring the torque sensor 1, and the torque sensor 1 can be miniaturized.

Furthermore, because the phase difference correspondence signal is output by processing the analogue output signals of resolvers 21, 22 without digitization, the resolution of torque sensor 1 can be increased without increasing the load of computing, by comparison with that in the case when the value corresponding to the torque transmitted by the two shafts 3, 4 is found from the value obtained by A/D converting and introducing the output signals of each resolver 21, 22. Further, although the reference torque value is found from the value obtained by A/D converting the output signals of each resolver 21, 22, it is sufficient if this reference torque value is used for fault monitoring the torque sensor 1, therefore, this value is not required to be found with a high accuracy. Thus, there is no need to reduce the sampling cycle for introducing the A/D converted values more than required. Therefore, the load of computing is not increased.

Figure 7:
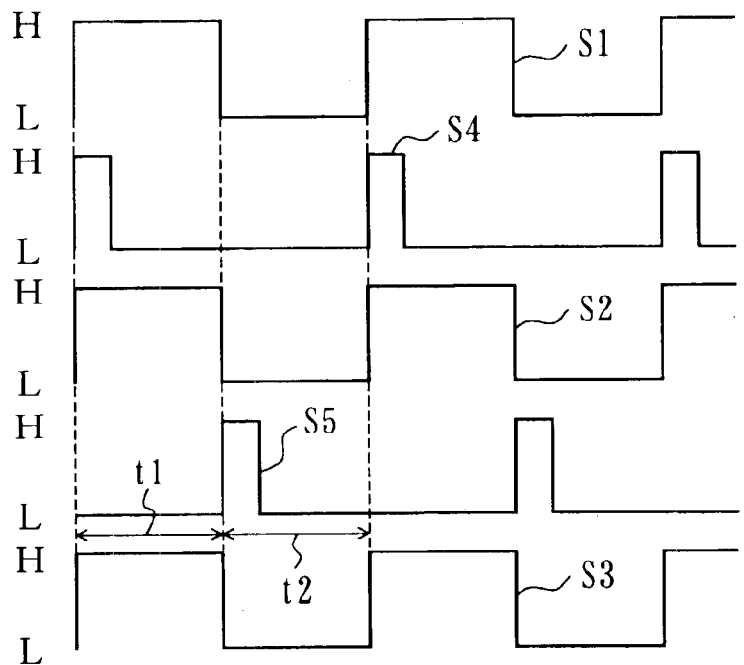
FIGS. 7(1) through 7(3) relate to the torque sensor of the modification example of the present invention.
Figure 7:
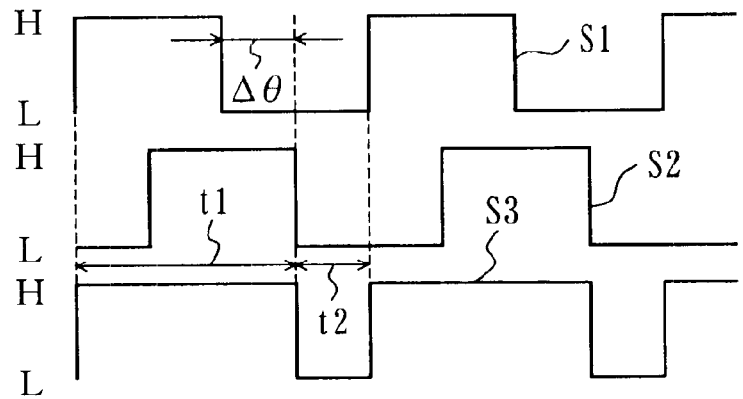
Figure 7:
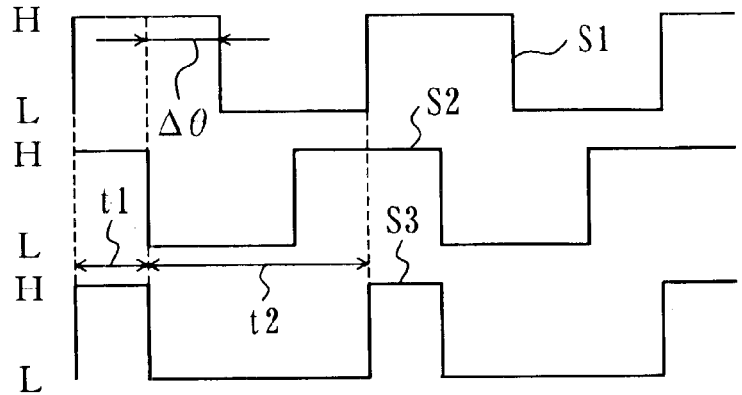

FIGS. 6, 7(1), 7(2), and 7(3) illustrate a modification example of the control unit 20. The difference from the above-described embodiment is that the mutual arrangement of the first resolver 21 and the second resolver 22 is such that the phase difference between the first alternating signal and the second alternating signal becomes zero when the torque transmitted by the first and second shafts 3, 4 is zero. The output signal processing unit 28 comprises a leading edge detection circuit 28*d* for the first logic signal output from the first logic signal conversion circuit 28*a* and a trailing edge detection circuit 28*e* for the second logic signal output from the second logic signal conversion circuit 28*b*. A SR (set-reset) flip-flop is used as the PWM processing circuit 28*c'*, instead of the circuit outputting the PWM signal corresponding to the exclusive OR of the first logic signal and second logic signal. The detection signal of the leading edge of the first logic signal is input to the S terminal of the flip-flop constituting the PWM processing circuit 28*c'*, and the detection signal of the trailing edge of the second logic signal is input to the R terminal thereof. As a result, the PWM signal is output from the PWM processing circuit 28*c'*. The PWM duty ratio of the PWM signal corresponds to the torque transmitted by the first and second shafts 3, 4.

To be more precise, FIG. 7(1) shows the first logic signal S1, the second logic signal S2, the PWM signal S3 output from the PWM processing circuit 28*c'*, the leading edge detection signal S4, and the trailing edge detection signal S5 when the transmission torque is zero. In this case, the phase difference between the first logic signal and the second logic signal is zero at $\Delta\theta=0$, and the time period t1 from the leading edge of the first logic signal to the trailing edge of the second logic signal is equal to the time period t2 from the trailing edge of the second logic signal to the leading edge of the first logic signal. Therefore, the PWM duty ratio is 50%. FIG. 7(2) shows the first logic signal S1, the second logic signal S2, and the PWM signal S3 when a torque in one direction is transmitted by the first and second shafts 3, 4. In this case, the phase difference between the first logic signal and the second logic signal becomes $\Delta\theta(>0)$ and the time period t1 from the leading edge of the first logic signal to the trailing edge of the second logic signal is longer than the time period t2 from the trailing edge of the second logic signal to the leading edge of the first logic signal. Therefore, the larger is the transmission torque, the higher is the PWM duty ratio above 50%. FIG. 7(3) shows the first logic signal S1, the second logic signal S2, and the PWM signal S3 when a torque in the other direction is transmitted by the first and second shafts 3, 4. In this case, the phase difference between the first logic signal and the second logic signal becomes $\Delta\theta(<0)$ and the time period t1 from the leading edge of the first logic signal to the trailing edge of the second logic signal is shorter than the time period t2 from the trailing edge of the second logic signal to the leading edge of the first logic signal. Therefore, the larger is the transmission torque, the lower is the PWM duty ratio below 50%. As a result, the PWM signal of which pulse width changes according to changes in the phase difference between the first alternating signal and the second alternating signal can be output, by employing general purpose components such as logic signal conversion circuits 28*a*, 28*b* for converting alternating signals into logic signals, circuits 28*d*, 28*e* for detecting the leading edge and trailing edge of logic signals, and the SR flip-flop for generating signals having the leading edge and trailing edge corresponding to the leading edge and trailing edge of logic signals. Other features are similar to those of the above-described embodiment, and identical components are assigned with the same symbols. Alternatively, the detection signal of the trailing edge of the second logic signal can be input to the S terminal of the SR flip-flop constituting the PWM processing circuit 28*c'*, and the detection signal of the leading edge of the first logic signal can be input to the R terminal. As a result, the PWM processing circuit 28*c'* outputs the PWM signal as the phase difference correspondence signal in which one of the leading edge of the first logic signal and the trailing edge of the second logic signal corresponds to the leading edge of the PWM signal and the other corresponds to the trailing edge of the PWM signal. Other features are similar to those of the above-described embodiment.

Figure 8:
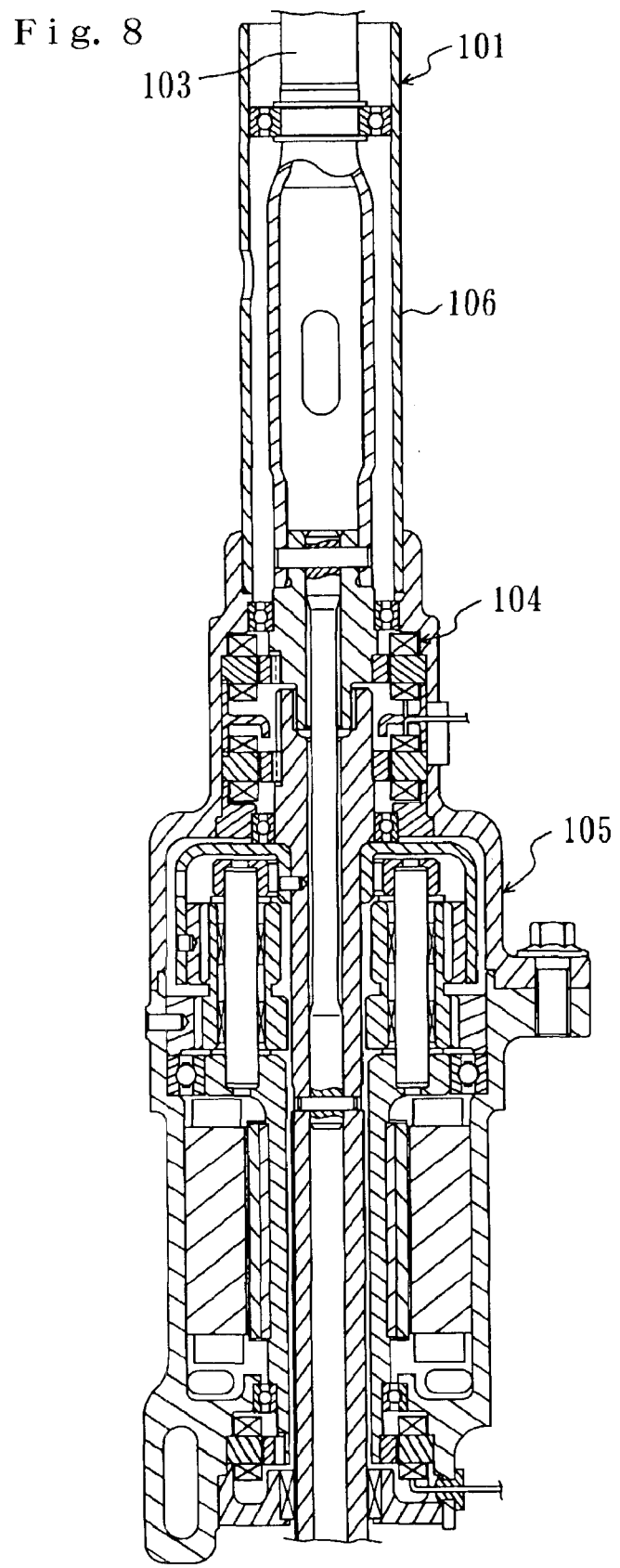
FIG. 8 is a cross-sectional view of an electric power steering apparatus equipped with the torque sensor of the second embodiment of the present invention.
Figure 9:
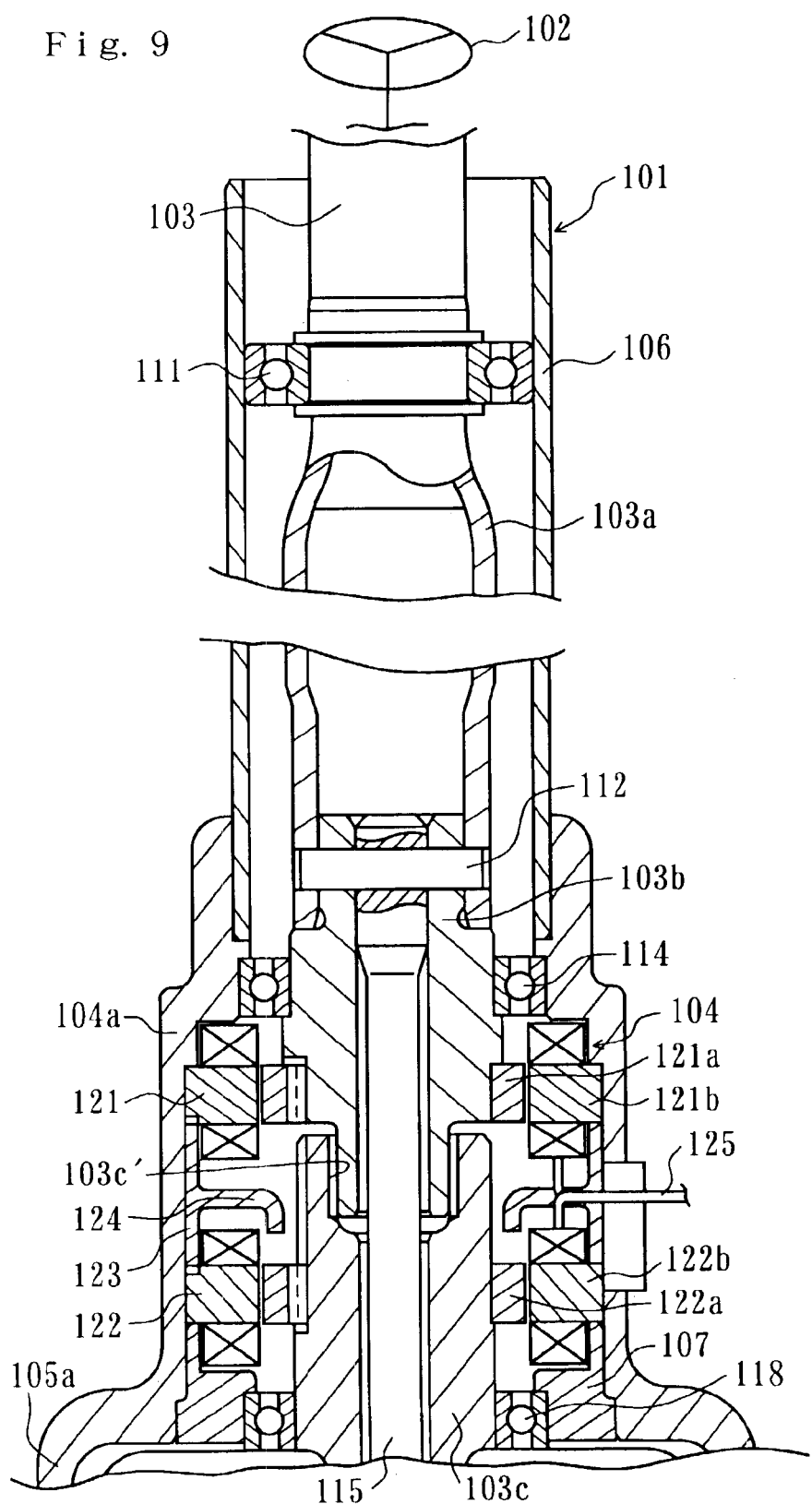
FIG. 9 is a cross-sectional view of the torque sensor of the second embodiment of the present invention.

An electric power steering device 101 of the second embodiment shown in FIGS. 8 through 10 comprises a steering wheel 102, a steering shaft 103 which is rotated by steering operation of the steering wheel 102, a torque sensor 104 for detecting the torque transmitted by the steering shaft 103, an electric actuator 105 driven according to the detected torque, and a steering column 106 covering the steering shaft 103. Rotation of the steering shaft 103 is transmitted by a steering gear (not shown in the figures) to the vehicle wheels, thereby changing the steering angle. The conventional steering gear, for example, a rack-and-pinion steering gear, can be used as the steering gear.

Figure 11:
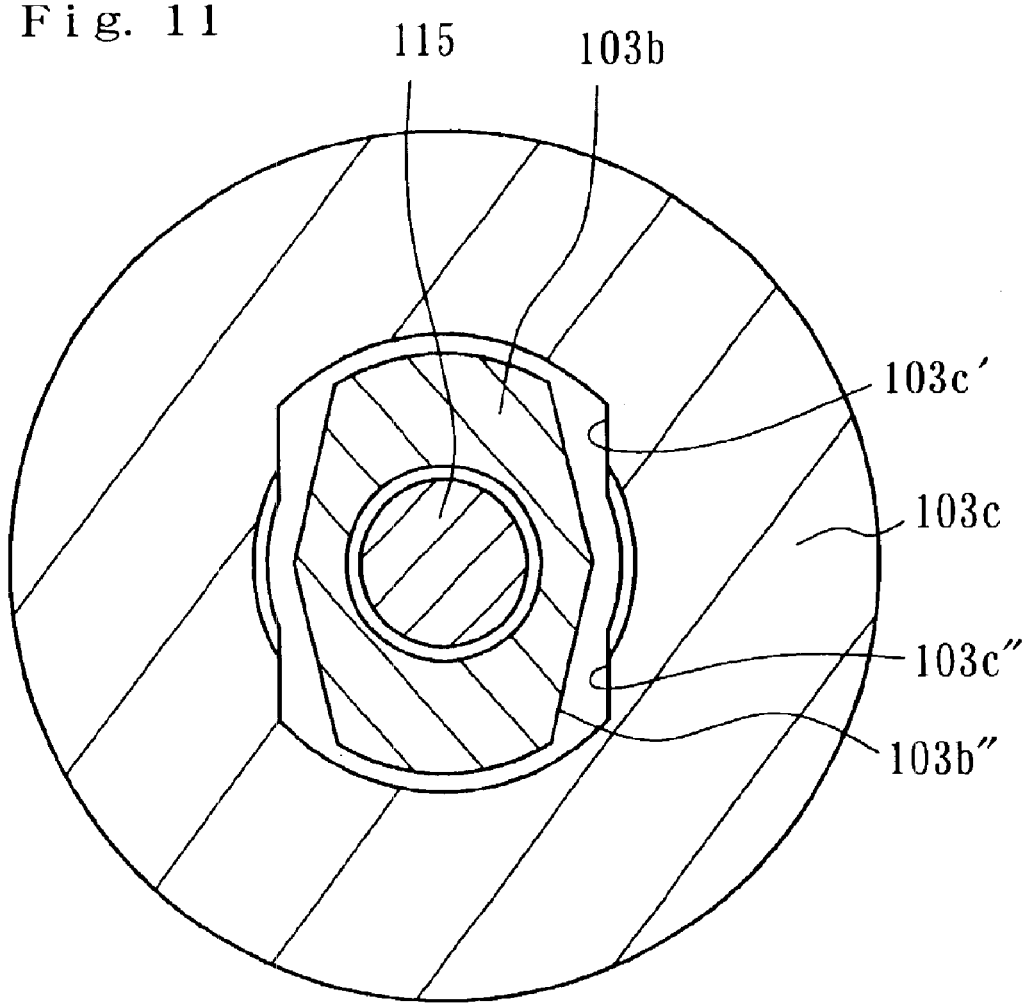
FIG. 11 is a partial lateral sectional view of the torque sensor of the second embodiment of the present invention.

As shown in FIG. 9 and FIG. 10, the steering shaft 103 comprises a tubular upper shaft 103a, a tubular first shaft 103b, and a tubular second shaft 103c. One end of the upper shaft 103a is connected to the steering wheel 102 and the other end is connected to one end of the first shaft 103b via a pin 112. A central recess 103c' is formed in the end surface of the second shaft 103c so that the shaft axis center passing through it, and the other end of the first shaft 103b is inserted as an insertion portion into this central recess 103c'. A torsion bar (elastic member) 115 is inserted into the first shaft 103b and the second shaft 103c, one end of the torsion bar 115 is connected via the pin 112 to the upper shaft 103a and the first shaft 103b, and the other end thereof is connected via a pin 117 to the second shaft 103c. As a result, the first shaft 103b and second shaft 103c rotate elastically with respect to each other around the same axis under the effect of twisting of the torsion bar 115 according to the steering torque transmitted by the steering shaft 103. As shown in FIG. 11, rotation-restricting surfaces 103b", 103c", which is arranged along a non-round shape as viewed in the shaft axial direction, are formed on the outer periphery of the insertion portion of the first shaft 103b and the inner periphery of the central recess 103c' of the second shaft 103c. The two rotation-restricting surfaces 103b", 103c" are brought into contact with each other by relative rotation of the first shaft 103b and the second shaft 103c, thereby limiting the relative rotation of the first shaft 103b and the second shaft 103c to a fixed range. As a result, the torsion bar 115 is prevented from damage. The outer periphery of the insertion portion of he first shaft 103b and the inner periphery of the central recess 103c' of the second shaft 103c are made such as to face each other via a space over the entire area till the relative rotation of the two shafts 103b, 103c is restricted. As a result, the relative inclination of the first shaft 103b and the second shaft 103c is restricted only by the torsion bar 115, and no bushing or the like for inclination restriction is inserted between the first shaft 103b and the second shaft 103c.

The upper shaft 103a is supported by the steering column 106 via a bearing 111, and the steering column 106 is fixed by pressing in the sensor housing 104a of the torque sensor 104. The first shaft 103b is supported by the sensor housing 104a via a bearing 14. One end of the second shaft 103c is supported by a ring-like resolver pushing member (detector pushing member) 107 pressed in the sensor housing 104a via a bearing 118, and the other end is supported by a ring-like resolver pushing member 139a pressed in the housing 105a of the actuator 105 via a needle bearing 119. The sensor housing 104a and the housing 105a of the actuator 105 are fixed to the vehicle body via a bracket or the like.

As shown in FIG. 9, the torque sensor 104 comprises a first resolver (first detector) 121 and a second resolver (second detector) 122 covered with the sensor housing 104a.

Figure 12:
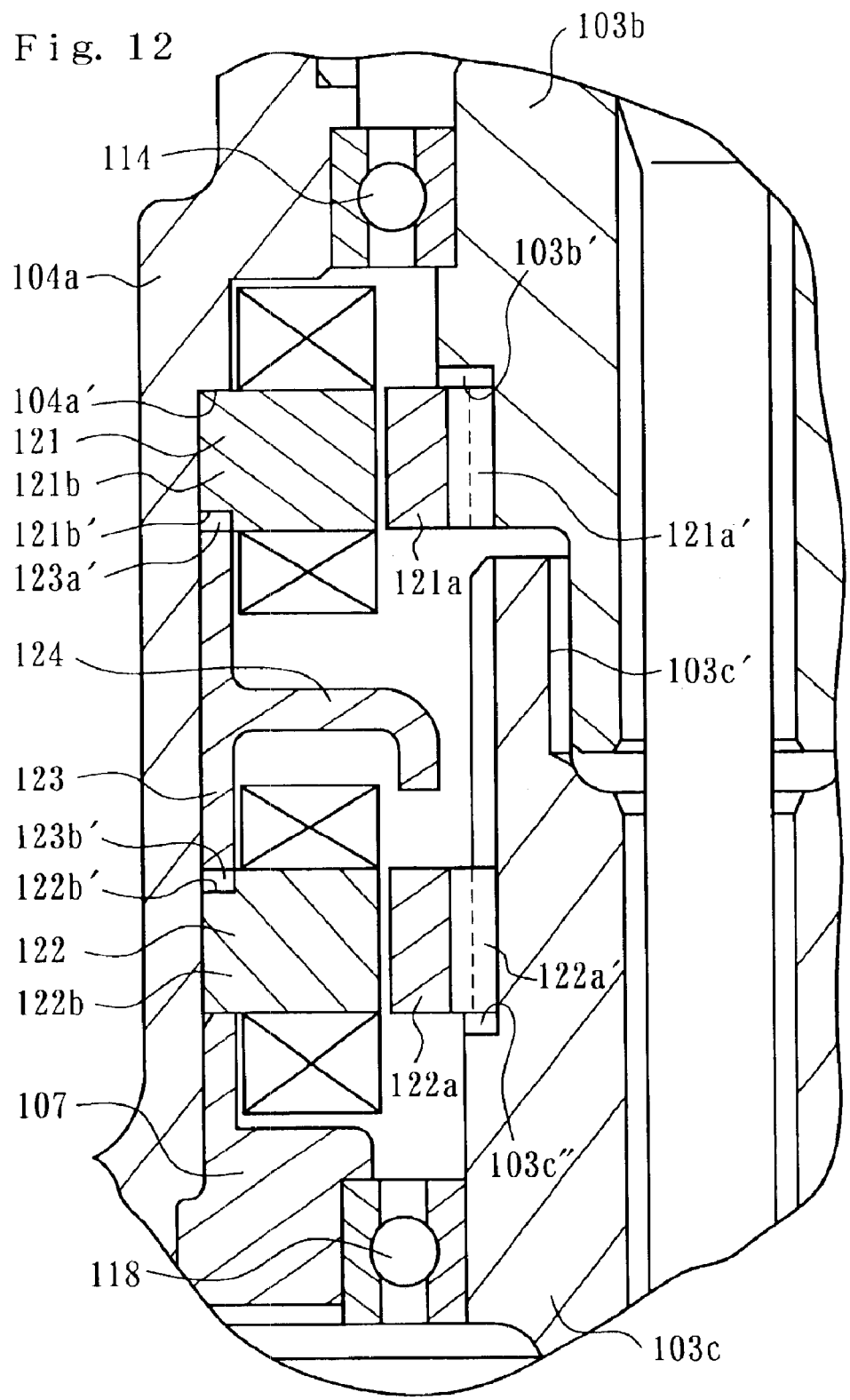
FIG. 12 is a partial cross-sectional view of the torque sensor of the second embodiment of the present invention.

The first resolver 121 comprises a first resolver rotor (first detector rotor) 121a fitted to the outer periphery of the first shaft 103b so as to rotate together therewith, and a ring-like first resolver stator (first detector stator) 121b covering the first resolver rotor 121a. As shown in FIG. 12, a plurality of first projections 121a' formed at equal intervals on the inner periphery of the first resolver rotor 121a are fit into a plurality of groove-like first recesses 103b' formed on the outer periphery of the first shaft 103b from the axial direction of the first and second shafts (referred hereinbelow as "shaft axial direction") via a clearance in the rotation direction of the first and second shafts (referred hereinbelow as "shaft rotation direction"). As a result, fitting the first projections 121a' into the first recesses 103b' makes it possible to set approximately the position of the first resolver rotor 121a in the shaft rotation direction with respect to the first shaft 103b. The first resolver rotor 121a and the first shaft 103b rotate together because the first shaft 103b is pressed in the first resolver rotor 121a. Alternatively, the first recesses can be formed in the first resolver rotor 121a, and the first projections can be formed in the first shaft 103b. No limitation is placed on the number of the first projections 121a' and the first recesses 103b'.

The second resolver 122 comprises a second resolver rotor (second detector rotor) 122a fitted to the outer periphery of the second shaft 103c so as to rotate together therewith, and a ring-like second resolver stator (second detector stator) 122b covering the second resolver rotor 122a. As shown in FIG. 12, a plurality of second projections 122a' formed at equal intervals on the inner periphery of the second resolver rotor 122a are fit into a plurality of groove-like second recesses 103c" formed on the outer periphery of the second shaft 103c from the shaft axial direction via a clearance in the shaft rotation direction. As a result, fitting the second projections 122a' into the second recesses 103c" makes it possible to set approximately the position of the second resolver rotor 122a in the shaft rotation direction with respect to the second shaft 103c. The second resolver rotor 122a and the second shaft 103c rotate together because the second shaft 103c is pressed in the second resolver rotor 122a. Alternatively, the second recesses can be formed in the second resolver rotor 122a, and the second projections can be formed in the second shaft 103c. No limitation is placed on the number of the second projections 122a' and the second recesses 103c".

A tubular spacer 123 is disposed between the first resolver stator 121b and second resolver stator 122b. A plurality of third protrusions 123a' formed integrally at equal intervals on one end of the spacer 123 are fit into a plurality of third recesses 121b' formed on the outer periphery of the first resolver stator 121b from the shaft axial direction via a clearance in the shaft rotation direction. A plurality of fourth protrusions 123b' formed integrally at equal intervals on the other end of the spacer 123 are fit into a plurality of fourth recesses 122b' formed on the outer periphery of the second resolver stator 122b from the shaft axial direction via a clearance in the shaft rotation direction. Fitting the third protrusions 123a' into the third recesses 121b' and fitting the fourth protrusions 123b' into the fourth recesses 122b' make it possible to set approximately the position of the first resolver stator 121b in the shaft rotation direction with respect to the second resolver stator 122b. Alternatively, the third protrusions can be formed in the first resolver stator 121b, the third recesses can be formed in the spacer 123, the fourth protrusions can be formed in the second resolver stator 122b, and the fourth recesses can be formed in the spacer 123. No limitation is placed on the number of the third protrusions 123a', third recesses 121b', fourth protrusions 123b', and fourth recesses 122b'.

The first resolver stator 121b, the second resolver stator 122b, and the spacer 123 are fit in the inner periphery of sensor housing 104a from the shaft axial direction via a clearance in the radial direction of the first and second shafts (referred hereinbelow as "shaft radial direction"). The two resolver stators 121b, 122b and the spacer 123 are fixed to the sensor housing 104a by being sandwiched between the resolver pushing member 107 press fit into the sensor housing 104a and a step 104a' formed on the inner periphery of the sensor housing 104a. A load applied for pressing the resolver pushing member 107 in the sensor housing 104a can be set small to facilitate assembling, and part of the resolver pushing member 107 can be caulked after pressing to cause plastic deformation and attachment to the sensor housing 104a.

A ring-like magnetic shielding part 124 extending inwardly from the inner periphery of the spacer 123 is formed integrally with this spacer 123 from magnetic shielding material. Magnetic shielding between the first resolver 121 and the second resolver 122 is conducted with the magnetic shielding part 124. Integrating the spacer 123 with the magnetic shielding part 124 makes it possible to decrease the number of components, reduce the number of assembly operations, and reduce cost.

When an exciting signal is input to a winding (not shown in the figures) provided on the first resolver rotor 121a, the first resolver 121 outputs a first sine amplitude signal and a first cosine amplitude signal from the two-phase windings (not shown in the figures) provided on the first resolver stator 121b. Thus, the first sine amplitude signal can be represented by $KE \sin(\omega t)\sin\theta$ and the first cosine amplitude signal can be represented by $KE \sin(\omega t)\cos\theta$, where the exciting signal is denoted by $E \sin(\omega t)$ and the rotation angle of the first shaft 103b is denoted by $\theta$. In those formulas, E is a signal amplitude, K is a transformation ratio, $\omega$ is an angular frequency of excitation, and t is time.

When an exciting signal is input to a winding (not shown in the figures) provided on the second resolver rotor 122a, the second resolver 122 outputs a second sine amplitude signal and a second cosine amplitude signal from the two-phase windings (not shown in the figures) provided on the second resolver stator 122b. The second sine amplitude signal can be represented by $KE \sin(\omega t)\sin(\theta+\Delta\theta)$ and the second cosine amplitude signal can be represented by $KE \sin(\omega t)\cos(\theta+\Delta\theta)$, where the exciting signal is denoted by $E \sin(\omega t)$ and the rotation angle of the second shaft 103c is denoted by $\theta+\Delta\theta$.

The output signals of the two resolvers 121, 122 are input via a signal cable 125 to a control unit (not shown in the figures), which is provided on the outside of the sensor housing 107 and identical to the control unit 20 of the first embodiment. The signal cables 125 for the first resolver 121 and the second resolver 122 are collected at the position between the two resolvers 121, 122 and pulled to the outside of the sensor housing 104a via notches provided in the spacer 123 and the sensor housing 104a, thereby saving the space.

The relative arrangement of the first resolver 121 and the second resolver 122 is such that the phase difference between the above-mentioned first alternating signal and second alternating signal becomes $\pi/2$ when the torque transmitted by the steering shaft 103 is zero. After the position of the first resolver stator 121b with respect to the second resolver stator 122b is approximately set in the shaft rotation direction, phase adjustment can be conducted electrically so that the phase difference becomes $\pi/2$. No specific limitation is placed on such phase adjustment means.

As shown in FIG. 10, the electric actuator 105 comprises an electric motor 132 for generating a steering assistance force and a reduction planetary gear mechanism 133. The housing 105a comprises two members 105a', 105a" connected to each other with a bolt 130, one 105a' of the members being formed integrally with the sensor housing 104a. A stator 135 fixed on the inner periphery of this housing 105a and a tubular rotor 138 covering the steering shaft 103 and arranged coaxially with the steering shaft 103 are provided. Because the motor 132 of the present embodiment is a brushless motor, a resolver 139 for detecting the rotation position of the rotor 138 is provided, and the output signal of this resolver 139 is output to the control unit via a cable 139'.

The planetary gear mechanism 133 is disposed between the torque sensor 104 and the motor 132, and comprises a carrier 141, a plurality of first planetary gears 142, a plurality of second planetary gears 143, a first ring gear 144, and a second ring gear 145. The number of the first planetary gears 142 is equal to that of the second planetary gears 143 and is, for example, three.

One end of the rotor 138 is supported by the housing 105a via a first bearing 136, and the other end of this rotor 138 is integrated with the carrier 141. The carrier 141 is supported by the housing 105a via the second bearing 137. To be more precise, the carrier 141 is pressed into the inner periphery of the second bearing 137, and the second bearing 137 is pressed into the inner periphery of the housing 105a. As a result, the carrier 141 is rotated together with the rotor 138 about the same axis center. The carrier 141 of the present embodiment has a ring-like shape and extends from the other end of the rotor 138 to the outside in the radial direction. Forming the rotor 138 and the carrier 141 monolithically reduces the number of parts, shortens time required for assembling, and reduces cost.

A plurality of first planetary gears 142 and the second planetary gears 143 of which number is equal to the first planetary gears 142 are supported by the carrier 141 so as to be rotatable about the axis parallel to the rotor 138. The rotor 138, the first planetary gears 142, and the second planetary gears 143 are arranged in a row in the rotor axial direction, and the first planetary gears 142 are disposed between the rotor 138 and the second planetary gears 143. The first planetary gears 142 are disposed at equal intervals in the circumferential direction of the rotor 138, and the second planetary gears 143 are also disposed at equal intervals in the circumferential direction of the rotor 138. As a result, the first planetary gears 142 and the second planetary gears 143 are disposed so as to surround the second shaft 103c of the steering shaft 103.

The first planetary gears 142 and the second planetary gears 143 are paired one by one, and each paired first planetary gear 142 and second planetary gear 143 rotate together about the same axis. In the present embodiment, each pair of first and the second planetary gear 142, 143 that rotate together are formed monolithically by gear cutting, thereby reducing the number of parts, time required for assembling, and cost. Furthermore, one end of each support shaft 146 having an axis parallel to the axis of the rotor 138 is pressed in respective shaft support holes 141a formed in the carrier 141. The support shafts 146 are inserted in the first planetary gears 142 and the second planetary gears 143 via needle bearings 147a, 147b so as to be rotatable with respect to the gears about the same axis. The other ends of the support shafts 146 are pressed in shaft support holes 152a formed in a ring-like receiving member 152. The receiving member 152 is fixed to the carrier 141 with a connection member (not shown in the figures) such as a stanchion or a bolt. The gear module of each first planetary gear 142 is equal to that of each second planetary gear 143, the number of teeth in each first planetary gear 142 is an integer multiple of the number of the first planetary gears 142, and the number of teeth in each second planetary gear 143 is an integer multiple of the number of the second planetary gears 143. Stable and efficient transmission of rotation can be obtained by arranging the rotation centers of a plurality of first planetary gears 142 and the rotation centers of a plurality of second planetary gears 143 on the circumference of a circle at equal intervals.

The first ring gear 144 is pressed into the inner periphery of the housing 105a. In the present embodiment, the load for pressing the first ring gear 144 in the housing 105a is set small to facilitate assembling, and the gear is locked in the housing 105a with a pin 148. As a result, the first ring gear 144 is fixed to the housing 105a. Each first planetary gear 142 is engaged with the inner teeth of the first ring gear 144.

The second bearing 137 is sandwiched between the first ring gear 144 and a step 105b formed on the inner periphery of the housing 105a. As a result, vibrations of the second bearing 137 are suppressed, and the number of parts can be reduced because the first ring gear 144 is utilized. Further, accuracy error at the assembling of the first ring gear 144 receiving the rotation force transmitted by the planetary gear mechanism 133 can be decreased, the movement of the first planetary gears 142 transmitting the rotation force is stabilized, and vibrations and noise can be suppressed.

The second ring gear 145 is fixed to an output member 149 rotating together with the second shaft 103c of the steering shaft 103, so that it rotates together with the steering shaft 103. Each second planetary gear 143 is engaged with inner teeth of the second ring gear 145. The output member 149 comprises an inner tubular part 149a, an outer tubular part 149b, and a ring-like connection part 149c connecting one end of the inner tubular part 149a to one end of the outer tubular part 149b. The second ring gear 145 is pressed into the inner periphery of the outer tubular part 149b. In the present embodiment, the load applied for pressing the second ring gear 145 in the outer tubular part 149b is set small to facilitate assembling, and the gear is locked in the outer tubular part 149b with a pin 150. The second shaft 103c is pressed into the inner periphery of the inner tubular part 149a. In the present embodiment, the load applied for pressing the second shaft 103c in the inner tubular part 149a is set small to facilitate assembling, and the shaft is locked in the inner tubular part 149a with a pin 151. As a result, the output member 149 is connected so as to rotate together with the steering shaft 103. Because the first and second planetary gears 142, 143 and the first and second ring gears 144, 145 are arranged between the connection part 149c and the carrier 141, the planetary gear mechanism 133 can be disposed in a small space.

In each pair of first and second planetary gear 142, 143 that rotate together, the positions of at least one tooth of respective gears in the circumferential direction are equal to each other. As a result, after each first planetary gear 142 is engaged with the first ring gear 144, the second ring gear 145 can be easily engaged with the second planetary gear 143 that rotate together with the first planetary gear 142. Therefore, the number of assembly operations is reduced and stresses acting on the engaging portions of the gears due to accuracy error at the assembling are reduced, thereby increasing endurance and preventing drop in rotation transmission efficiency caused by misalignment of parts during rotation transmission.

By controlling the actuator 105 with the control unit according to the torque detected by the torque sensor 104, the rotation of the motor 132 is transmitted to the steering shaft 103 via the planetary gear mechanism 133. As a result, a steering assistance force is applied which corresponds to the steering torque transmitted by the steering shaft 103.

Supporting the first planetary gears 142 and the second planetary gears 143 by the carrier 141 rotating together with the rotor 138 about the same axis makes it possible to arrange the rotor 138, the first planetary gears 142, and the second planetary gears 143 in a row along the rotor axial direction. The first planetary gears 142 and the second planetary gears 143 are engaged with the internal teeth of the ring gears 144, 145. As a result, the size of the planetary gear mechanism 133 in the radial direction of the rotor can be reduced by comparison with the case in which the first planetary gears 142 are arranged on the outside in the radial direction of the rotor 138. Furthermore, because the rotor 138 and both planetary gears 142, 143 have mutually overlapping portions when viewed from the rotor axial direction, the size in the radial direction can be further reduced.

Furthermore, because the carrier 141 is supported with good stability by the housing 105a via the first and second bearings 136, 137 and the rotor 138, the occurrence of vibrations and noise can be suppressed. Furthermore, supporting the rotor 138 and the carrier 141 with a common second bearing 137 makes it possible to decrease the number of parts and to reduce the time required for assembling and cost.

Figure 13:
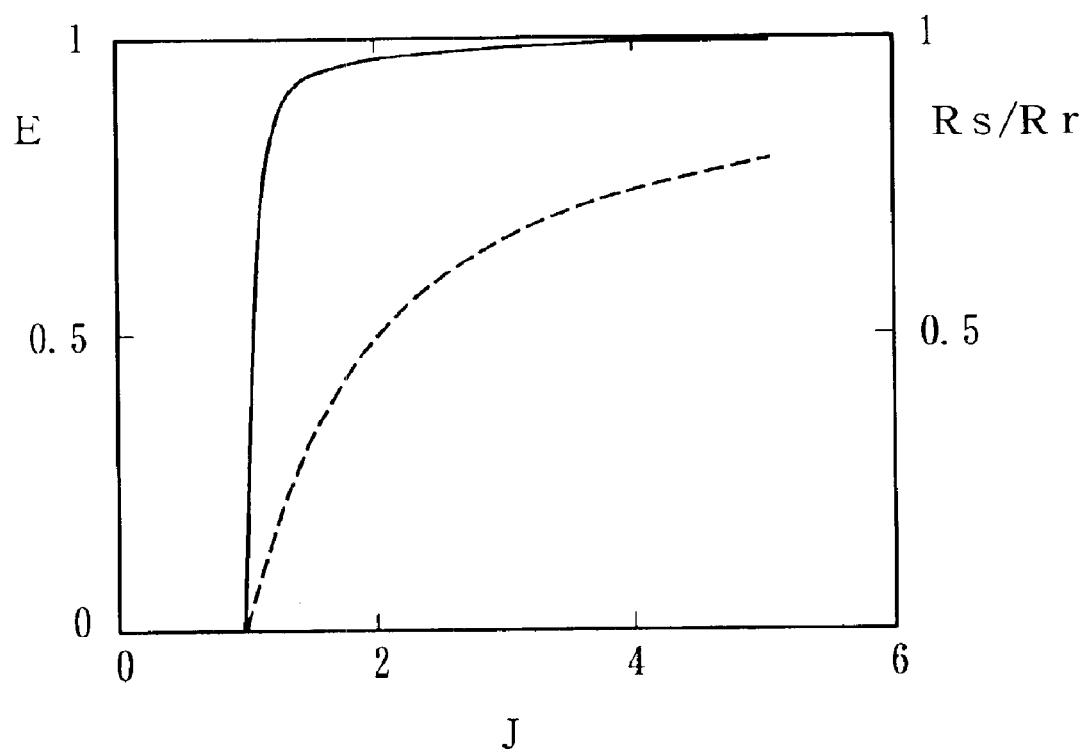
FIG. 13 illustrates the relationship between the rotation transmission efficiency and rotation transmission ratio of a planetary gear mechanism in the electric power steering apparatus equipped with the torque sensor of the second embodiment of the present invention.

Further, because the carrier 141 is pressed into the inner periphery of the second bearing 137, and the second bearing 137 is pressed into the inner periphery of the housing 105a, the deterioration in the concentric accuracy of the rotation center of the carrier 141 and the rotation center of rotor 138 caused by accuracy error at the assembling can be suppressed, and the decrease in the rotation transmission efficiency caused by variations of the rotation transmission ratio of the planetary gear mechanism 133 can be prevented. To be more precise, FIG. 13 shows the relationship between the rotation transmission efficiency E and rotation transmission ratio J of the planetary gear mechanism 133. In FIG. 13, E stands for a rotation transmission efficiency from the rotor 138 to the steering shaft 103, Rr stands for a rotor rotation speed, Rs stands for a steering shaft rotation speed, and $J = Z1a \cdot Z2b/(Z2a \cdot Z1b)$, wherein $Z1a$ is the number of teeth in the first planetary gears 142, $Z2a$ is the number of teeth in the second planetary gears, $Z1b$ is the number of teeth in the first ring gear 144, and $Z2b$ is the number of teeth in the second planetary gear 145. Here, $Z1b > Z2b$. In FIG. 13, the solid line represents the relationship between E and J, and the broken line represents the relationship between Rs/Rr and J. According to FIG. 13, it can be confirmed that variations in J, that is, variations in the rotation transmission ratio in the planetary gear mechanism 133 have to be suppressed in order to decrease Rs/Rr and prevent E from becoming too small. Therefore, it is preferred that the carrier 141 is pressed into the inner periphery of the second bearing 137, and that the second bearing 137 is pressed into the inner periphery of the housing 105a. As a result, the deterioration in the concentric accuracy of the rotation center of the carrier 141 and the rotation center of the rotor 138 caused by accuracy error at the assembling can be suppressed and the decrease in the rotation transmission efficiency caused by variations in the rotation transmission ratio of the planetary gear mechanism 133 can be prevented.

Furthermore, because one end of the support shafts 146 is pressed in the shaft support holes 141a of the carrier 141, and the other end is pressed in the shaft support holes 152a of the receiving member 152, the first planetary gears 142 and the second planetary gears 143 can be easily assembled with the carrier 141 from the axial direction of the rotor 138.

Furthermore, because the second ring gear 145 is pressed in the outer tubular part 149b of the output member 149, and the steering shaft 103 is inserted in the inner tubular member 149a so as to rotate together therewith, the connection of the second ring gear 145 and the steering shaft 103 can be conducted easily and with good accuracy and the occurrence of vibrations and noise can be suppressed.

For example, it is assumed that the inner diameter of the rotor 138 of the electric actuator 105 is 20 mm, the ratio of the rotation speed of the steering shaft 103 to the rotation speed of the rotor 138 is ⅒, the rotation speed of the motor 132 is 3000 rpm, the maximum output torque is 40 Nm, the number of teeth in the first planetary gear 142 is 21, the number of teeth in the second planetary gear 143 is 18, the number of teeth in the first ring gear 144 is 63, the number of teeth in the second ring gear 145 is 60, the gear module of each gear is 1, the standard rack pressure angle is 20 degrees, and the standard pitch is 3.142 mm. In this case, the outer diameter of the actuator 105 can be reduced by 35% through 40% and the size thereof in the axial direction can be reduced by 10% through 15% by comparison with the case in which the electric motor and planetary gear mechanism are used in the conventional electric power steering apparatus, provided that the rotation transmission efficiency is the same.

According to the torque sensor 104 of the present embodiment, the position of the first resolver rotor 121a relative to the first shaft 103b in the rotation direction is set by fitting the first protrusion 121a' into the first recess 103b', the position of the second resolver rotor 122a relative to the second shaft 103c in the rotation direction is set by fitting the second protrusion 122a' into the second recess 103c", and the position of the first resolver stator 121b relative to the second resolver stator 122b in the rotation direction is set by fitting the third protrusion 123a' into the third recess 121b' and fitting the fourth protrusion 123b' into the fourth recess 122b'. As a result, approximate setting of the position of the first resolver 121 relative to the second resolver 122 in the shaft rotation direction can be performed only by approximate setting the position of the first shaft 103b relative to the second shaft 103c in the rotation direction.

The two resolver stators 121b, 122b and the spacer 123 can be easily fitted to the inner periphery of the sensor housing 104a from the axial direction via a clearance in the radial direction. Moreover, the resolver pushing member 107 can be fixed to the sensor housing 104a only by pressing in the sensor housing 104a. As a result, the number of assembly operations can be decreased and cost can be reduced. The outer diameter of the bearing 118 can be adjusted so as to be equal to that of the bearing 114 by varying the inner diameter of the resolver pushing member 107, the model types of the two bearings 114, 118 can be unified, and cost reduction can be attained.

When the insertion portion of the first shaft 103b is inserted into the central recess 103c' of the second shaft 103c in order to prevent the damage of the torsion bar 115 by limiting the relative rotation of the first shaft 103b and the second shaft 103c, the approximate mutual alignment of the two shafts 103b, 103c in the rotation direction can be easily set by setting the relative position of the two shafts 103b, 103c in the rotation direction approximately in the center of the relative rotation range. After the setting of the mutual alignment, the two shafts 103b, 103c can be connected via the torsion bar 115. As a result, the number of assembly operations can be decreased and cost can be reduced. Furthermore, because there is no bushing or similar component between the first shaft 103b and the second shaft 103c for restricting the relative inclination of the shafts, the hysteresis of alternating signals of the resolvers 121, 122 can be prevented and the deterioration of steering feeling can be prevented.

Figure 14:
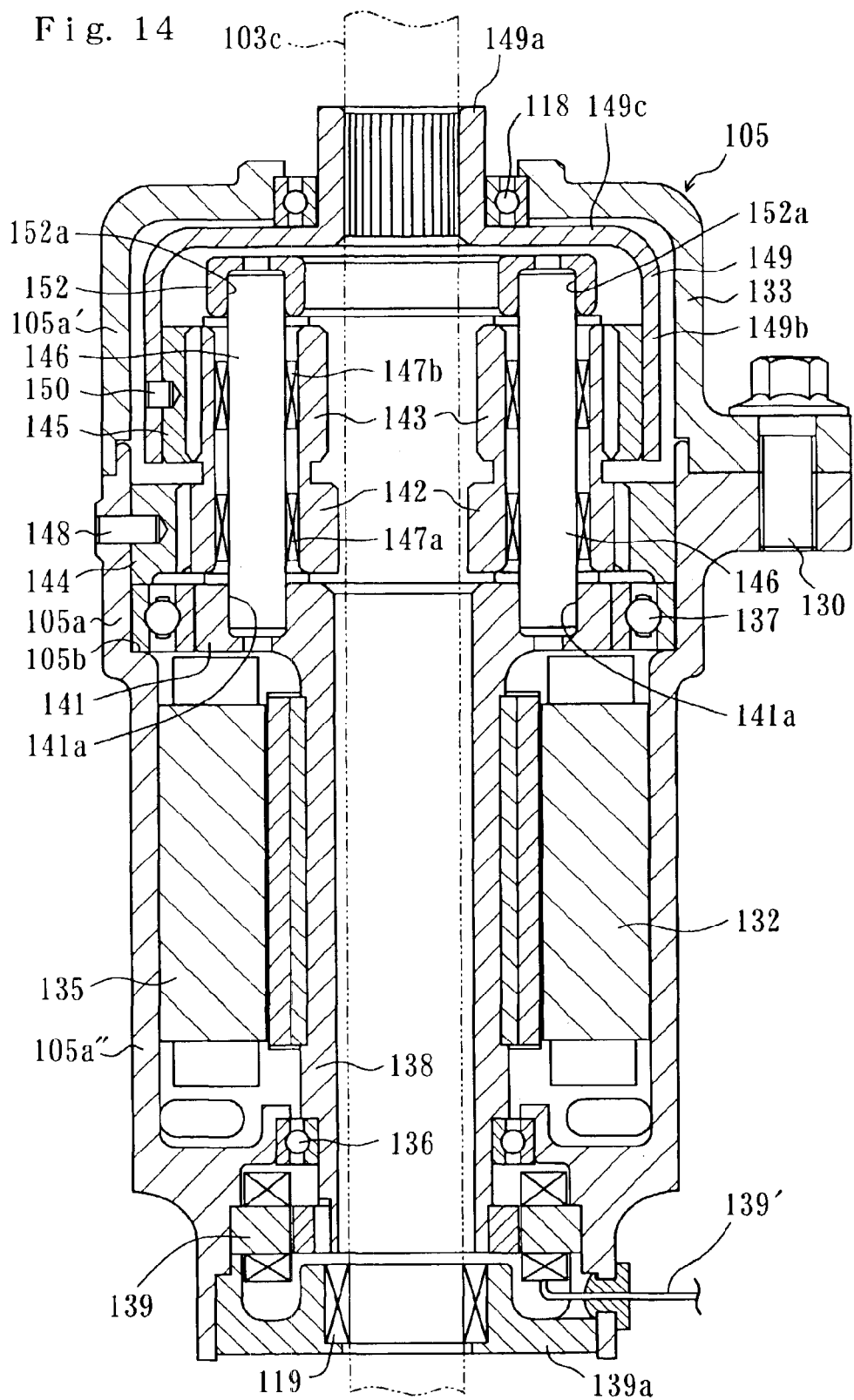
FIG. 14 is a cross-sectional view of an electric actuator relating to a modification example of the electric power steering apparatus equipped with the torque sensor of the second embodiment of the present invention.

In the above-described embodiment, the structural member 105a' of the housing 105a of the electric actuator 105 is formed integrally with the sensor housing 104a, but it can be formed as a separate component as shown in the modification example in FIG. 14. In this case, it is preferred that striations along the axial direction, such as serration, splines, and the like, are provided on the inner periphery of the inner tubular part 149a and the outer periphery of the second shaft 103c of the steering shaft 103 and that the steering shaft 103 is pressed in the inner tubular part 149a via those striations so as to rotate together therewith. As a result, the assembling can be facilitated and the occurrence of vibrations and noise can be suppressed. Furthermore, one end of the second shaft 103c is supported by the housing 105a via the inner tubular part 149a and the bearing 118 by supporting the inner tubular part 149a by the inner periphery of the housing 105a via the bearing 118. The sensor housing 104a is connected to the housing 105a, for example, by pressing. Other features are similar to those of the above-described embodiment. Identical components are assigned with the same symbols.

The present invention is not limited to the above-described embodiments and modification examples.

For example, in the above-described embodiments and modification examples, the first and second alternating signals are output by adding the first and second phase shift signals, which are obtained by phase shifting the first and second sine amplitude signals output from the first and second resolvers 21, 22, to respective first and second cosine amplitude signals. However, the first and second alternating signals can be directly output from the first and second resolvers 21, 22. To be more precise, the first alternating signal represented by $KE \sin(\omega t + \theta)$ can be output from the winding of the first resolver rotor 21a by inputting exciting signals represented by $E \sin(\omega t)$ and $E \cos(\omega t)$ to the two-phase windings of the first resolver rotor 21b, and the second alternating signal represented by $KE \sin(\omega t + \theta + \Delta\theta)$ can be output from the winding of the second resolver rotor 22a by inputting exciting signals represented by $E \sin(\omega t)$ and $E \cos(\omega t)$ to the two-phase windings of the second resolver rotor 22b. In this case, the first signal processing unit 26 and the second signal processing unit 27 described in the above embodiments are unnecessary as respective alternating signal output means. As a result, the first and second alternating signals can be output by using the resolvers 21, 22, which are the general purpose components, and the structure can be further simplified.

In the above-described embodiments, the PWM duty ratio of the PWM signal output from the output signal processing unit 28 is used as a value corresponding to the transmission torque. However, a time integrated value of the PWM signal can be also used as the value corresponding to the transmission torque.

The signal corresponding to the detected torque value is not limited to that used for controlling the steering assisting force and can be also used, for example, for controlling the actuator for providing the driver with reaction force corresponding to the detected torque value.

In the first embodiment, the phase difference between the first alternating signal and the second alternating signal when the torque transmitted by the first and second shafts is zero is not limited to $\pi/2$, as long as the signal corresponding to the exclusive OR of the first logic signal and the second logic signal corresponds to the torque transmitted by the first and second shafts.

The torque sensor according to the present invention can be also used in apparatuses other than electric power steering devices.

What is claimed is:

1. A torque sensor comprising:

a first shaft;

a second shaft capable of rotating elastically with respect to said first shaft;

a first alternating signal output means for outputting a first alternating signal of which phase changes according to changes in the rotation angle of said first shaft;

a second alternating signal output means for outputting a second alternating signal of which phase changes according to changes in the rotation angle of said second shaft;

an output signal processing unit for outputting a phase difference correspondence signal of which waveform changes according to changes in a phase difference between said first alternating signal and second alternating signal wherein;

said output signal processing unit having a first logic signal conversion circuit for converting said first alternating signal into a first logic signal, a second logic signal conversion circuit for converting said second alternating signal into a second logic signal such that a phase difference between said first alternating signal and said second alternating signal is equal to a phase difference between said first logic signal and said second logic signal;

said output signal processing unit processing said first logic signal and said second logic signal to produce said phase difference correspondence signal from which a value corresponding to a torque transmitted by the first and second shafts is found.

2. The torque sensor according to claim 1, wherein:

said first alternating signal output means comprises a first detector and a first signal processing unit;

said first detector outputs output signals including a first sine amplitude signal represented by KE $\sin(\omega t)\sin\theta$ and a first cosine amplitude signal represented by KE $\sin(\omega t)\cos\theta$, where KE is a coefficient, $\omega$ is an angular frequency of an excitation signal, t is time, and $\theta$ is a rotation angle of the first shaft;

said first signal processing unit has a first phase shift circuit producing a first phase shift signal represented by KE $\sin(\omega t+\pi/2)\sin\theta$ by a $\pi/2$ phase shift of said first sine amplitude signal and a first addition circuit producing said first alternating signal represented by KE $\sin(\omega t+\theta)$ by adding up said first phase shift signal and first cosine amplitude signal;

said second alternating signal output means comprises a second detector and a second signal processing unit;

said second detector outputs output signals including a second sine amplitude signal represented by KE $\sin(\omega t)\sin(\theta+\Delta\theta)$ and a second cosine amplitude signal represented by KE $\sin(\omega t)\cos(\theta+\Delta\theta)$, where KE is a coefficient, $\omega$ is an angular frequency of an excitation signal, t is time, and $\theta+\Delta\theta$ is a rotation angle of the second shaft; and said second signal processing unit has a second phase shift circuit producing a second phase shift signal represented by KE $\sin(\omega t+\pi/2)\sin(\theta+\Delta\theta)$ by a $\pi/2$ phase shift of said second sine amplitude signal and a second addition circuit producing said second alternating signal represented by KE $\sin(\omega t+\theta+\Delta\theta)$ by adding up said second phase shift signal and second cosine amplitude signal.

3. The torque sensor according to claim 1, wherein:

said first alternating signal output means has a first detector for outputting said first alternating signal represented by KE $\sin(\omega t+\theta)$, where KE is a coefficient, $\omega$ is an angular frequency of an excitation signal, t is time, and $\theta$ is a rotation angle of the first shaft; and said second alternating signal output means has a second detector for outputting said second alternating signal represented by KE $\sin(\omega t+\theta+\Delta\theta)$, where KE is a coefficient, $\omega$ is an angular frequency of an excitation signal, t is time, and $\theta+\Delta\theta$ is a rotation angle of the second shaft.

4. The torque sensor according to claim 2 or 3, wherein:

said first detector and second detector are relatively arranged so that the phase difference between said first alternating signal and second alternating signal becomes a set value when the torque transmitted by said first and second shafts is zero; and said output signal processing unit has for processing said first logic signal and second logic signal a PWM processing circuit for outputting a PWM signal corresponding to an exclusive OR of said first logic signal and second logic signal as said phase difference correspondence signal.

5. The torque sensor according to claim 2 or 3, wherein:

said output signal processing unit has for processing said first logic signal and second logic signal a circuit for detecting the leading edge of said first logic signal, a circuit for detecting the trailing edge of said second logic signal, and a PWM processing circuit for outputting a PWM signal as said phase difference correspondence signal in which one of the leading edge of said first logic signal and the trailing edge of said second logic signal corresponds to the leading edge of said PWM signal and the other corresponds to the trailing edge of said PWM signal.

6. A torque sensor comprising:

a first shaft;

a second shaft capable of rotating elastically with respect to said first shaft;

a first alternating signal output means for outputting a first alternating signal of which phase changes according to chances in the rotation angle of said first shaft;

a second alternating signal output means for outputting a second alternating signal of which phase changes according to changes in the rotation angle of said second shaft;

an output signal processing unit for outputting a phase difference correspondence signal of which waveform changes according to changes in the phase difference between said first alternating signal and second alternating signal, wherein a value corresponding to a torque transmitted by the first and second shafts is found from said phase difference correspondence signal;

said first alternating signal output means having a first detector and a first signal processing unit;

said first detector outputting output signals including a first sine amplitude signal represented by KE sin(ωt)sin θ and a first cosine amplitude signal represented by KE sin(ωt)cos θ, where KE is a coefficient, ω is an angular frequency of an excitation signal, t is time, and θ is a rotation angle of the first shaft;

said first signal processing unit having a first phase shift circuit producing a first phase shift signal represented by KE sin(ωt+π/2)sin θ by a π/2 phase shift of said first sine amplitude signal and a first addition circuit producing said first alternating signal represented by KE sin(ωt+θ) by adding up said first phase shift signal and first cosine amplitude signal;

said second alternating signal output means having a second detector and a second signal processing unit;

said second detector outputting output signals including a second sine amplitude signal represented by KE sin(ωt)sin(θ+Δθ) and a second cosine amplitude signal represented by KE sin(ωt)cos(θ+Δθ), where KE is a coefficient, ω is an angular frequency of an excitation signal, t is time, and θ+Δθ is a rotation angle of the second shaft;

said second signal processing unit having a second phase shift circuit producing a second phase shift signal represented by KE sin(ωt+π/2)sin(θ+Δθ) by a π/2 phase shift of said second sine amplitude signal and a second addition circuit producing said second alternating signal represented by KE sin(ωt+θ+Δθ) by adding up said second phase shift signal and second cosine amplitude signal;

a sensor housing;

said first detector having a first detector rotor and a ring-like first detector stator covering said first detector rotor;

said second detector having a second detector rotor and a ring-like second detector stator covering said second detector rotor;

said first shaft being pressed in said first detector rotor, said second shaft being pressed in said second detector rotor, and said first detector stator and said second detector stator being fixed with respect to said sensor housing;

a first recess formed in one of an inner periphery of said first detector rotor and an outer periphery of said first shaft, and a first protrusion fit from an axial direction of said first and second shafts via a clearance in a rotation direction of said first and second shafts into said first recess formed in the other of the inner periphery of said first detector rotor and the outer periphery of said first shaft;

a second recess formed in one of an inner periphery of said second detector rotor and an outer periphery of said second shaft, and a second protrusion fit from said axial direction via a clearance in said rotation direction into said second recess formed in the other of the inner periphery of said second detector rotor and the outer periphery of said second shaft;

a tubular spacer arranged between said first detector stator and said second detector stator;

a third recess formed in one of said first detector stator and said spacer, and a third protrusion fit from said axial direction via a clearance in said rotation direction into said third recess formed in the other of said first detector stator and said spacer; and a fourth recess formed in one of said second detector stator and said spacer, and a fourth protrusion fit from said axial direction via a clearance in said rotation direction into said fourth recess formed in the other of said second detector stator and said spacer.

7. The torque sensor provided with a fault monitoring function, according to claim 2, comprising:

a computing device to which the output signals of said first detector, the output signals of said second detector, and the phase difference correspondence signal are input, wherein a reference torque value corresponding to the difference in the rotation angle between the two shafts is found from the output signals of the first and second detectors, and also the deviation between the detected torque value corresponding to the phase difference correspondence signal and said reference torque value is found with said computing device; and said computing device outputs a fault signal when the absolute value of said deviation is not less than a set value.

8. A torque sensor provided with a fault monitoring function, comprising:

a first shaft;

a second shaft capable of rotating elastically with respect to said first shaft;

a first detector for outputting output signals including analog signals of which amplitude changes according to changes in the rotation angle of said first shaft;

a means for outputting a first alternating signal of which phase changes according to changes in the rotation angle of said first shaft by processing the output signals of said first detector;

a second detector for outputting output signals including analog signals of which amplitude changes according to changes in the rotation angle of said second shaft;

a means for outputting a second alternating signal of which phase changes according to changes in the rotation angle of said second shaft by processing the output signals of said second detector;

an output signal processing unit for outputting a phase difference correspondence signal of which waveform changes according to changes in the phase difference between said first alternating signal and second alternating signal;

said output signal processing unit having a first logic signal conversion circuit for converting said first alternating signal into a first logic signal, a second logic signal conversion circuit for converting said second alternating signal into a second logic signal such that a phase difference between said first alternating signal and said second alternating signal is equal to a phase difference between said first logic signal and said second logic signal;

said output signal processing unit processing said first logic signal and said second logic signal to produce said phase difference correspondence signal;

a computing device to which the output signals of said first detector, the output signals of said second detector, and the phase difference correspondence signal are input, wherein a reference torque value corresponding to a difference in the rotation angle between the two shafts is found from the output signals of the two detectors, and also a deviation between a detected torque value corresponding to the phase difference correspondence signal and said reference torque value is found with said computing device; and said computing device outputs a fault signal when an absolute value of said deviation is not less than a set value.

9. A torque sensor provided with a fault monitoring function, comprising:

a first shaft;

a second shaft capable of rotating elastically with respect to said first shaft;

a first detector for outputting output signals including analog signals of which amplitude changes according to changes in the rotation angle of said first shaft;

a means for outputting a first alternating signal of which phase changes according to changes in the rotation angle of said first shaft by processing the output signals of said first detector without digitizing;

a second detector for outputting output signals including analog signals of which amplitude changes according to changes in the rotation angle of said second shaft;

a means for outputting a second alternating signal of which phase changes according to changes in the rotation angle of said second shaft by processing the output signals of said second detector without digitizing;

a means for outputting a phase difference correspondence signal of which waveform changes according to changes in a phase difference between said first alternating signal and second alternating signal by processing said first alternating signal and second alternating signal without digitizing;

a means for finding a reference torque value corresponding to a difference in the rotation angle between the two shafts from values obtained by A/D converting the output signals of the two detectors;

a means for finding a deviation between the detected torque value corresponding to the phase difference correspondence signal and said reference torque value; and a means for outputting a fault signal when an absolute value of said deviation is not less than a set value, wherein said means for outputting said phase difference correspondence signal has a first logic signal conversion circuit for converting said first alternating signal into a first logic signal, a second logic signal conversion circuit for converting said second alternating signal into a second logic signal such that a phase difference between said first alternating signal and said second alternating signal is equal to a phase difference between said first logic signal and said second logic signal and said phase difference correspondence signal is produced from processing said first logic signal and said second logic signal.

10. The torque sensor according to claim 8 or claim 9, wherein:

said analog signals of said first detector include a first sine amplitude signal represented by KE $\sin(\omega t)\sin\theta$ and a first cosine amplitude signal represented by KE $\sin(\omega t)\cos\theta$, where KE is a coefficient, $\omega$ is an angular frequency of an excitation signal, t is time, and $\theta$ is a rotation angle of the first shaft;

said means for outputting a first alternating signal includes a first phase shift circuit for producing a first phase shift signal represented by KE $\sin(\omega t+\pi/2)\sin\theta$ by a $\pi/2$ phase shift of said first sine amplitude signal and a first addition circuit for producing said first alternating signal represented by KE $\sin(\omega t+\theta)$ by adding up said first phase shift signal and first cosine amplitude signal;

said analog signals of said second detector include a second sine amplitude signal represented by KE $\sin(\omega t)\sin(\theta+\Delta\theta)$ and a second cosine amplitude signal represented by KE $\sin(\omega t)\cos(\theta+\Delta\theta)$, where KE is a coefficient, $\omega$ is an angular frequency of an excitation signal, t is time, and $\theta+\Delta\theta$ is a rotation angle of the second shaft; and said means for outputting a second alternating signal includes a second phase shift circuit for producing a second phase shift signal represented by KE $\sin(\omega t+\pi/2)\sin(\theta+\Delta\theta)$ by a $\pi/2$ phase shift of said second sine amplitude signal and a second addition circuit for producing said second alternating signal represented by KE $\sin(\omega t+\theta+\Delta\theta)$ by adding up said second phase shift signal and second cosine amplitude signal.

11. The torque sensor according to claim 10, wherein:

said first detector and second detector are relatively arranged so that the phase difference between said first alternating signal and second alternating signal becomes a set value when the torque transmitted by said first and second shafts is zero; and said means for outputting said phase correspondence signal has a PWM processing circuit for outputting a PWM signal corresponding to an exclusive OR of said first logic signal and second logic signal as said phase difference correspondence signal.

12. The torque sensor according to claim 10, wherein said means for outputting said phase correspondence signal has a circuit for detecting a leading edge of said first logic signal, a circuit for detecting a trailing edge of said second logic signal, and a PWM processing circuit for outputting a PWM signal as said phase difference correspondence signal in which one of the leading edge of said first logic signal and the trailing edge of said second logic signal corresponds to the leading edge of said PWM signal and the other corresponds to the trailing edge of said PWM signal.

13. A torque sensor, comprising:

a first shaft;

a second shaft capable of rotating elastically with respect to said first shaft;

a first alternating signal output means for outputting a first alternating signal of which phase changes according to changes in the rotation angle of said first shaft;

a second alternating signal output means for outputting a second alternating signal of which phase changes according to changes in the rotation angle of said second shaft;

an output signal processing unit for outputting a phase difference correspondence signal of which waveform changes according to changes in the phase difference between said first alternating signal and second alternating signal;

a sensor housing;

said first alternating signal output means having a first detector, and said second alternating signal output means having a second detector;

said first detector having a first detector rotor and a ring-like first detector stator covering said first detector rotor;

said second detector having a second detector rotor and a ring-like second detector stator covering said second detector rotor;

said first shaft being pressed in said first detector rotor, said second shaft being pressed in said second detector rotor, and said first detector stator and said second detector stator being fixed with respect to said sensor housing; and a value corresponding to the torque transmitted by the first and second shafts being found from said phase difference correspondence signal, wherein a first recess is formed in one of the inner periphery of said first detector rotor and the outer periphery of said first shaft, and a first protrusion which is to be fit from the axial direction of said first and second shafts via a clearance in the rotation direction of said first and second shafts into said first recess is formed in the other of the inner periphery of said first detector rotor and the outer periphery of said first shaft;

a second recess is formed in one of the inner periphery of said second detector rotor and the outer periphery of said second shaft, and a second protrusion which is to be fit from said axial direction via a clearance in said rotation direction into said second recess is formed in the other of the inner periphery of said second detector rotor and the outer periphery of said second shaft;

a tubular spacer is arranged between said first detector stator and said second detector stator;

a third recess is formed in one of said first detector stator and said spacer, and a third protrusion which is to be fit from said axial direction via a clearance in said rotation direction into said third recess is formed in the other of said first detector stator and said spacer; and a fourth recess is formed in one of said second detector stator and said spacer, and a fourth protrusion which is to be fit from said axial direction via a clearance in said rotation direction into said fourth recess is formed in the other of said second detector stator and said spacer.

14. The torque sensor according to claim 13, comprising a detector pushing member which is pressed in said sensor housing from said axial direction, wherein said first detector stator, second detector stator, and spacer are fitted to the inner periphery of said sensor housing from said axial direction via a clearance in the radial direction of said first and second shafts; and the two detector stators and spacer are sandwiched between said detector pushing member and a step formed on the inner periphery of the sensor housing.

15. The torque sensor according to claim 13 or 14, wherein:

said first shaft and second shaft are connected via an elastic member;

a central recess is formed in the end surface of one of said first shaft and said second shaft so that shaft axis center passing through it, and the end portion of the other of said first shaft and said second shaft is inserted as an insertion portion into said central recess;

relative rotation of said first and second shafts is limited to a fixed range by mutual contact of a rotation-restricting surface formed on the inner periphery of said central recess and a rotation-restricting surface formed on the outer periphery of the insertion portion due to the relative rotation; and the inner periphery of said central recess and the outer periphery of the insertion portion face to each other via a space over the entire region till the relative rotation of the two shafts is limited.

16. The torque sensor according to claim 13, wherein:

a ring-like magnetic shielding part extending inwardly from the inner periphery of said spacer is formed from a magnetic shielding material integrally with the spacer, and magnetic shielding between the first detector and second detector is conducted by said magnetic shielding part.

\* \* \* \* \*